United States Patent
Wang et al.

(10) Patent No.: US 12,290,928 B2
(45) Date of Patent: May 6, 2025

(54) SYSTEMS AND METHODS FOR FLEXIBLE ROBOTIC MANIPULATION BY FAST ONLINE LOAD ESTIMATION

(71) Applicant: Mitsubishi Electric Research Laboratories, Inc., Cambridge, MA (US)

(72) Inventors: Yebin Wang, Cambridge, MA (US); Xiaoming Duan, Boston, MA (US); Toshiaki Koike-Akino, Cambridge, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 346 days.

(21) Appl. No.: 17/656,113

(22) Filed: Mar. 23, 2022

(65) Prior Publication Data
US 2023/0302636 A1 Sep. 28, 2023

(51) Int. Cl.
*B25J 9/16* (2006.01)
(52) U.S. Cl.
CPC ............ *B25J 9/1633* (2013.01); *B25J 9/163* (2013.01)
(58) Field of Classification Search
CPC ........ B25J 9/1633; B25J 9/163; B25J 9/1638; B25J 9/1674; B25J 9/1664; B25J 9/00;
(Continued)

(56) References Cited

U.S. PATENT DOCUMENTS 9,981,382 B1 * 5/2018 Strauss ................. B25J 9/1697
10,946,519 B1 * 3/2021 Prats ..................... G05B 15/00
(Continued)

FOREIGN PATENT DOCUMENTS

| CN | 111037567 | | 4/2020 | |
|---|---|---|---|---|
| JP | H06138930 | A * | 5/1994 | |
| KR | 2016122107 | A * | 10/2016 | ............ B25J 13/08 |

OTHER PUBLICATIONS

Xin et al., "Application of Deep Reinforcement Learning in Mobile Robot Path Planning," Jan. 1, 2018 (Year: 2018).*
(Continued)

*Primary Examiner* — Adam R Mott
*Assistant Examiner* — Byron Xavier Kasper
(74) *Attorney, Agent, or Firm* — Gene Vinokur

(57) ABSTRACT

Provided herein is a method for controlling a manipulator, comprising accepting an initial pose of a load and a task for moving the load and retrieving using a mapping function, an identification trajectory corresponding to the initial pose of the load and controlling a plurality of actuators of the manipulator to move the load according to the retrieved identification trajectory and obtaining measured motion data and estimated motion data of the load each corresponding to motion of the load. The method further comprises estimating parameters of the load based on the measured motion data and the estimated motion data, obtaining a model of the manipulator having the load with the estimated parameters, and determining a performance trajectory to move the load according to the task based on the obtained model of the manipulator. The method further comprises controlling the actuators to move the load according to the performance trajectory.

17 Claims, 17 Drawing Sheets

(58) Field of Classification Search
CPC .......... B25J 9/16; B25J 9/1612; B25J 9/1671; G05B 2219/39364
See application file for complete search history.

(56) References Cited

U.S. PATENT DOCUMENTS

| | | | | |
|---|---|---|---|---|
| 11,254,003 | B1* | 2/2022 | Zhao | G05D 1/0217 |
| 11,919,169 | B2* | 3/2024 | Lee | G06V 20/50 |
| 2012/0150350 | A1* | 6/2012 | Ohno | B25J 9/1666 700/262 |
| 2012/0173019 | A1* | 7/2012 | Kim | B25J 9/1669 700/245 |
| 2016/0016311 | A1* | 1/2016 | Konolige | B25J 9/1664 901/30 |
| 2017/0348855 | A1* | 12/2017 | Abe | B25J 9/1674 |
| 2019/0275675 | A1* | 9/2019 | Seno | G05B 19/02 |
| 2020/0316782 | A1* | 10/2020 | Chavez | G06T 7/73 |
| 2021/0001481 | A1* | 1/2021 | Hayashi | G06N 20/00 |
| 2021/0146532 | A1* | 5/2021 | Rodriguez Garcia | B25J 9/0087 |
| 2022/0055213 | A1* | 2/2022 | Kang | G05B 17/02 |
| 2022/0297958 | A1* | 9/2022 | Moreno | B25J 9/1664 |
| 2022/0348409 | A1* | 11/2022 | Sun | B07C 5/3412 |

OTHER PUBLICATIONS

Atkeson, Christopher G., Chae H. An, and John M. Hollerbach. "Estimation of inertial parameters of manipulator loads and links." The International Journal of Robotics Research 5, No. 3 (1986): 101-119.

Ayusawa, Ko, Antoine Rioux, Eiichi Yoshida, Gentiane Venture, and Maxime Gautier. "Generating persistently exciting trajectory based on condition number optimization." In 2017 IEEE International Conference on Robotics and Automation (ICRA), pp. 6518-6524. IEEE, 2017.

Kubus, Daniel, Torsten Kroger, and Friedrich M. Wahl. "On-line estimation of inertial parameters using a recursive total least-squares approach." In 2008 IEEE/RSJ International Conference on Intelligent Robots and Systems, pp. 3845-3852. IEEE, 2008.

* cited by examiner

SYSTEMS AND METHODS FOR FLEXIBLE ROBOTIC MANIPULATION BY FAST ONLINE LOAD ESTIMATION

FIELD OF THE INVENTION

This invention relates generally to load identification and control of robotic arms, and more particularly to supervised learning-based approaches for online trajectory generation in load estimation tasks for robots.

BACKGROUND OF THE INVENTION

Robots are deployed in several tasks ranging from day-to-day activities to complex industrial jobs. Many situations require robots to interact with objects and obstacles near them. The objects and/or obstacles with which the robots may interact, serve as payloads for the robots. Quite often, the interactions of the robots with their corresponding loads include performing robotic manipulations by manipulators on the payloads. In order to control the operation of such robotic manipulators, accurate physical models of the payloads and the environment to generate desired motions (trajectories) for the manipulators are required to accomplish designated tasks. Also, as part of the manipulator model, for example in the context of flexible manipulation, the payloads may vary from time to time and from task to task. Therefore, it is vitally important to identify/estimate the payload dynamically, which allows the design and implementation of informed controls.

In order to conduct dynamic load estimation, the manipulator must follow a specially designed trajectory along which the necessary motion data are collected. It is critical to generate the trajectory in a time efficient manner since fast trajectory generation for the load estimation reduces the estimation time and further enables online implementations. Also, payload estimation requires solving a non-linear optimization problem. Given that manipulators may need to operate in environments where the payload and its configurations may change dynamically in state and time, the payload estimation process should be able to adapt to such dynamic changes and provide an accurate outcome. Doing this online remains a challenge since designing the trajectory for each instance and solving the underlying optimization process is processing intensive and time consuming. Any delay in accurate payload estimation gets reflected in the execution of the manipulation task which is undesirable and should be minimized as far as possible. Accordingly, there is a need to perform accurate payload estimation for dynamically changing scenarios in a time efficient manner.

SUMMARY OF THE INVENTION

Some example embodiments are based on a realization that accurate payload estimation is an important step towards obtaining an accurate manipulator dynamical model for control purposes. The concerned payload parameters include the mass, the center of the mass, or the moments of inertia of the payload or their combination. Some example embodiments realize that the payload estimation process may consist of: 1) building an identification model for the manipulator with the payload parameters as the unknowns; 2) designing a trajectory that sufficiently excites the manipulator so that the payload parameters are identifiable; 3) collecting and processing the motion data (for example, triplet samples of the joint position, velocity and acceleration) along the trajectory; and 4) solving a (weighted) least square problem and extracting the load parameters.

Some example embodiments are also based on the realization that the identification model can be turned into a linear model with the load parameters as unknowns, and as such, the task of accurately estimating load parameters may be transcribed to the design of the coefficient matrix, which is directly related to the undertaken trajectory. Some solutions are based on the realization that the identification trajectory is usually parameterized by a combination of basis functions, such as sinusoidal functions with various frequencies, and the goal is to determine the optimal parameters in the trajectory so that the coefficient matrix is well conditioned with respect to certain underlying metrics. Some example embodiments are based on the realization that due to the sheer complexity of the relationship between the parameters of the trajectory and the metric quantifying the quality of the coefficient matrix, optimal trajectory design involves solving a difficult and time-consuming nonlinear programming, with various constraints such as velocity and acceleration constraints. That is, some embodiments realize that in online settings, in order to speed up the estimation process, faster trajectory design is required.

For offline load identification, the optimization problems contain the initial configuration (joint angles) of the manipulator as design variables. However, this may not be true for flexible manipulation which requires real-time identification, and the initial configuration of the manipulator is fixed and is not free to choose. Available solutions in the state-of-the-art for load identification solve optimization problem at one time for one type of load. Some example embodiments are directed towards accurate real-time load identification which may have to solve many instances of the optimization problems even for the same load, depending on the initial configuration of the manipulator.

As such, it is an object of some example embodiments to provide a trajectory generation method that allows online trajectory generation for accurate robotic manipulator controls. Some example embodiments are also directed towards the objective of providing a trajectory generation approach that allows online trajectory generation for manipulator load identification systems and methods. It is also an objective of some embodiments to provide such a method that reduces the computation time of the trajectory generation caused by the highly nonlinear nature of concerned optimization problems. Further, some example embodiments are also directed towards providing systems and methods for fast trajectory generation for robotic manipulators.

Towards these ends, some example embodiments are based on recognition that a manipulator control system for controlling the movement of a manipulator to execute designated tasks may include a load identifier configured to estimate the load parameters. The manipulator control system may use such a load identifier to achieve better motion execution and control performance based on the available accurate model. However, some example embodiments also realize that the challenge for such a system is in constructing the load identifier in a computationally efficient manner suitable for online load estimation, where in the flexible manipulation setting, the manipulator needs to handle many loads with different parameters.

Some embodiments are based on understanding that the generation of identification trajectories may be achieved by solving nonlinear programming. However, an application of any direct optimization methods to the trajectory generation problem can result in a long computation time, greatly reducing the feasibility of this task to be performed online.

Specifically, due to the complicated relationship between the amplitudes of the sinusoidal basis functions that constitute the excitation trajectory and the coefficient matrix, the objective function of the trajectory design task is highly nonlinear and nonconvex. To that end, in order to find the optimal trajectory, the complex optimization problem has to be solved. As a result, the straightforward application of any direct optimization algorithms takes undesirable amount of time resulting in an impractical solution for online load estimation applications, making flexible manipulation infeasible.

Some embodiments are based on recognition that during the task execution of the robotic manipulator, the initial joint positions from which the dynamic load estimation starts, should not be arbitrarily chosen so that additional interruptions to normal tasks can be avoided. Aiming to alleviate such concerns, some embodiments treat the initial joint positions as a given input and find the optimal trajectory accordingly.

Some embodiments are based on recognition that trajectories generated offline can still be utilized online as long as the corresponding joint configurations match. However, the uncountability of the number of joint configurations makes building a lookup table for use online impossible. To this end, it is an object of some embodiments to provide solutions that are capable of representing and approximating the offline solved trajectory generation instances compactly and efficiently.

Some embodiments are based on the realization that the optimal trajectory for identification purpose is dependent on the initial joint configuration. Given a parameterization of optimal trajectories for load identification, the coefficients of basis functions uniquely define the optimal trajectory, and thus are regarded as functions of the initial joint configuration. As such, it is possible to learn the coefficient as functions of the initial joint configuration.

Some embodiments are based on understanding that supervised learning-based methods can be used to find a sufficiently excited trajectory parameterized by some basis functions. The parameterization reduces search space of the mapping between the initial configurations and the identification trajectories. Specifically, some example embodiments construct the optimal response as a function of the initial joint configuration by solving many instances of the trajectory design problem offline beforehand. The challenge of this approach is in selecting appropriate supervised learning approach that is capable of predicting trajectories with satisfactory qualities.

Some embodiments construct an optimal response with the initial joint configuration as the input and the amplitudes of the basis functions constituting the optimal excitation trajectory (also referred to as identification trajectory) as the output. The optimal response is approximated by functions obtained through supervised learning-based approaches such as linear regression with polynomial basis and Gaussian regressions.

Some embodiments are based on the understanding that actual exact trajectories utilized for estimation should satisfy the motion constraints and provide decent performance, e.g., decent estimation accuracy. To this end, some embodiments use the performance metric to measure the quality of the predicted trajectory and thus relax the requirement of exact optimal trajectory recovery. One advantage of this relaxation is that it drastically simplifies the design of supervised learning-based methods and allows for more flexibility.

Some embodiments are based on recognition that predicted optimal trajectory may not satisfy the physical constraints on the joint movements including the joint velocity and acceleration of the manipulator. To deal with the feasibility constraints, some embodiments process the predicted trajectory parameters by rescaling and projection. Such embodiments not only consider the dynamic constraints by restricting the predicted trajectories within the feasible sets, but also allow generation of trajectories with even better performance through rescaling the trajectory parameters to the boundary of the constraint sets.

Some embodiments are also based on understanding that function approximation using supervised learning-based methods can be made arbitrarily accurate when the size of the function domain is small. This corresponds to the case when the estimation task of the manipulator starts around the neighborhood of a few fixed initial positions. Some embodiments exploit this fact and partition potentially big joint configuration space into disjoint subspaces and train multiple function approximators for each subspace. During the online prediction phase, the measured current joint configuration determine which function approximator should be applied, thus providing flexibility to the approach.

In order to reduce the computational burden and speed up the processing, some embodiments partition the configuration space iteratively until the prediction performance in each subspace is sufficiently satisfactory. Specifically, a bisection method may be employed to partition a large subspace into smaller ones, and individual learning models can be trained in each subspace. This process repeats until in each subspace, the performance of the prediction reaches a predefined threshold. Moreover, a tradeoff can be flexibly adjusted between the granularity of the partition and the overall prediction performance according to special use case requirements. In some embodiments, the prediction performance over a specific space of interest that the initial configuration belongs to is measured by the percentage of cases that the identifiability score $f(Y_L)$ of the predicted trajectory outputted by the prediction model, or the value of the approximate value function is below a certain threshold. For example, for N distinctive initial configurations $q_0$ over the specific space of interest, one solves the N resultant optimal control problems to obtain the N optimal trajectories and the associated value function values, trains the prediction model with the optimal trajectories and the value function values, and evaluates the identifiability scores of the predicted trajectories from the prediction model. One further calculates the percentage of cases that the identifiability score is below a certain threshold (indicating good estimation accuracy). In another embodiment, the prediction performance over the specific space of interest is such that the root-mean-square-error between the true value function values of N cases and the approximated value function values is less than a certain threshold.

In order to achieve the aforementioned objectives and advantages, some example embodiments provide robotic manipulators, and methods and programs for controlling the robotic manipulators.

For example, some example embodiments provide a manipulator comprising at least one robotic arm having one or several joints configured to move a load according to a task. The manipulator also comprises a plurality of actuators configured to change a motion of the robotic arm to track a trajectory, a memory to store a model of the manipulator with unknown load information and a mapping function mapping initial poses of the load to corresponding identification trajectories, and an input interface configured to accept an initial pose of the load and the task for moving the load. The manipulator also comprises a processor for executing instructions for implementing different modules of the manipulator. In this regard the manipulator comprises a load estimator configured to retrieve using the mapping function, an identification trajectory corresponding to the initial pose of the load and control the plurality of actuators to move the load according to the retrieved identification trajectory, based on the model of the manipulator with unknown load information.

In some example embodiments, the load estimator is further configured to obtain measured motion data corresponding to the movement of the load according to the retrieved identification trajectory and estimated motion data of the load corresponding to motion of the load according to the identification trajectory and estimated based on the model of the manipulator, and estimate parameters of the load based on the measured motion data of the load and the estimated motion data of the load. The processor also comprises a performance controller configured to obtain a model of the manipulator having the load with the estimated parameters of the load and determine a performance trajectory to move the load according to the task based on the model of the manipulator having the load with the estimated parameters. The performance controller is further configured to control the actuators to move the load according to the performance trajectory.

Some example embodiments also provide a method for controlling a manipulator, the method comprising accepting an initial pose of a load and a task for moving the load and retrieving using a mapping function, an identification trajectory corresponding to the initial pose of the load, wherein the mapping function maps initial poses of the load to corresponding identification trajectories. The method further comprises controlling a plurality of actuators of the manipulator to move the load according to the retrieved identification trajectory and obtaining measured motion data, corresponding to the movement of the load according to the retrieved identification trajectory, and estimated motion data of the load corresponding to motion of the load according to the retrieved identification trajectory and estimated based on the model of the manipulator. The method further comprises estimating parameters of the load based on the measured motion data of the load and the estimated motion data of the load, for instance, joint velocities and accelerations can be estimated from the measured joint angles by robust differentiator, obtaining a model of the manipulator having the load with the estimated parameters of the load, and determining a performance trajectory to move the load according to the task based on the model of the manipulator having the load with the estimated parameters. The method still further comprises controlling the actuators to move the load according to the performance trajectory.

BRIEF DESCRIPTION OF DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

Figure 1A:
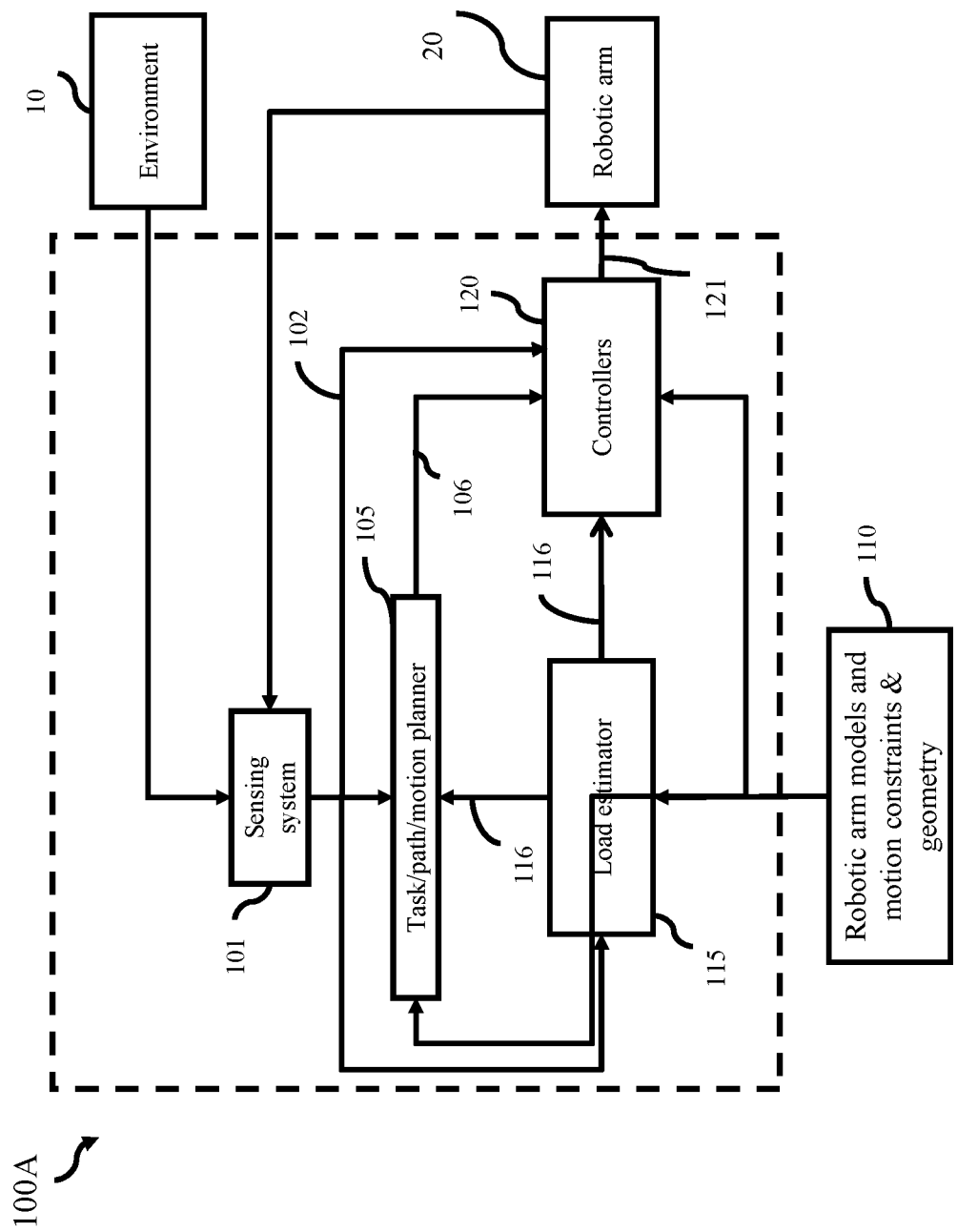
FIG. 1A illustrates a block diagram of an overall architecture of a system for load estimation, according to some example embodiments.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Robotic manipulation tasks need highly precise inputs to perform tasks in the desired manner. Accurate payload information is crucial for the efficient and precise control of robotic manipulators. Payload estimation when performed offline is based on the assumption that a manipulator operates with the same workpiece exclusively. However, real world scenarios are not limited to working with fixed loads alone; very often certain tasks require operating in scenarios where the payload or workpiece is variable in state and time. To better accommodate the payload variability with manipulators becoming increasingly versatile and at the same time maintain satisfactory control performance, load estimation must be achieved in a fast and online manner.

Dynamic load estimation is effectively possible when manipulators follow a good trajectory, where the quality of the trajectory is measured by some underlying metric. Some example embodiments provide supervised learning based approaches to achieve fast online trajectory generation and thus speed up the load estimation process. By solving many instances of the complicated constrained optimization problems regarding trajectory generation offline, the dynamic response of the trajectory parameters with respect to the initial joint configuration is obtained. The online trajectory generation task is completed by predicting the optimal response to the current joint configuration, which saves a great amount of time as compared to solving the original trajectory design problem on the go. Thus, some example embodiments provide computationally efficient and fast approaches for load estimation tasks. A significant advantage of such approaches is that the robotic manipulation controls associated with the computationally efficient and fast load estimation tasks provided herein are highly precise and quicker than those provided by traditional solutions. Towards these ends provided herein are provide robotic manipulators, and methods and programs for controlling the robotic manipulators.

FIG. 1A illustrates a block diagram of an overall architecture 100A of a system for load estimation, according to some example embodiments. A sensing system 101 collects information about a robotic arm 20 and the environment 10 of the robotic arm 20. In this regard, the sensing system 101 is coupled with the robotic arm in a manner that is suitable for sensing information about the robotic arm 20 and/or the environment 10. A task/path/motion planner 105 receives the sensed information 102 from the sensing system 101 and an estimate 116 of load parameters from a load estimator 115 and provides one or more outputs pertaining to a predicted identification trajectory 106 to one or more controllers 120 of the robotic manipulator.

The sensing system 101 may be realized through one or more sensors and associated circuitry. For example, the sensing system 101 may comprise position sensors, orientation sensors, imaging sensors, thermal sensors, weight sensors and other sensors for sensing state parameters of the manipulator and/or the payload.

The sensing system 101 senses one or more parameters of the manipulator, the environment 10 of the manipulator, and/or the payload and provides sensed information 102 for further processing. In some embodiments, sensing system 101 processes measurement data and produces sensed signals which represents geometric properties and poses of objects in the environment, current configuration of the robotic arm 20, velocities/accelerations of all joints of the robotic arm 20, and torques/forces of actuators of the robotic arm 20.

Geometric properties may include, but not limited to length, width, and height of a set of minimal bounding boxes containing an object. The object may be a payload, an obstacle for the manipulator or a part of the robotic manipulator. In some embodiments, geometric properties of an object are characterized as an occupancy map defined over 3-dimensional space. In some embodiment, sensing system 101 may utilize one or more imaging sensors such as cameras to recognize location and geometric properties of objects around the robotic arm 20. In another embodiment, some objects may bear devices which store information about the objects, and sensing system 101 may fetch and modify the stored information, or append information for future processing. Such information-carrying devices may include optical such as Quick Response (QR) code or Radio Frequency Identifier (RFID) as an example. Sensing system 101 may adopt an encoder to measure joint position, current sensor to indirectly infer torques or forces generated by actuators, or force/torque sensor to directly measure torques or forces.

Figure 1B:
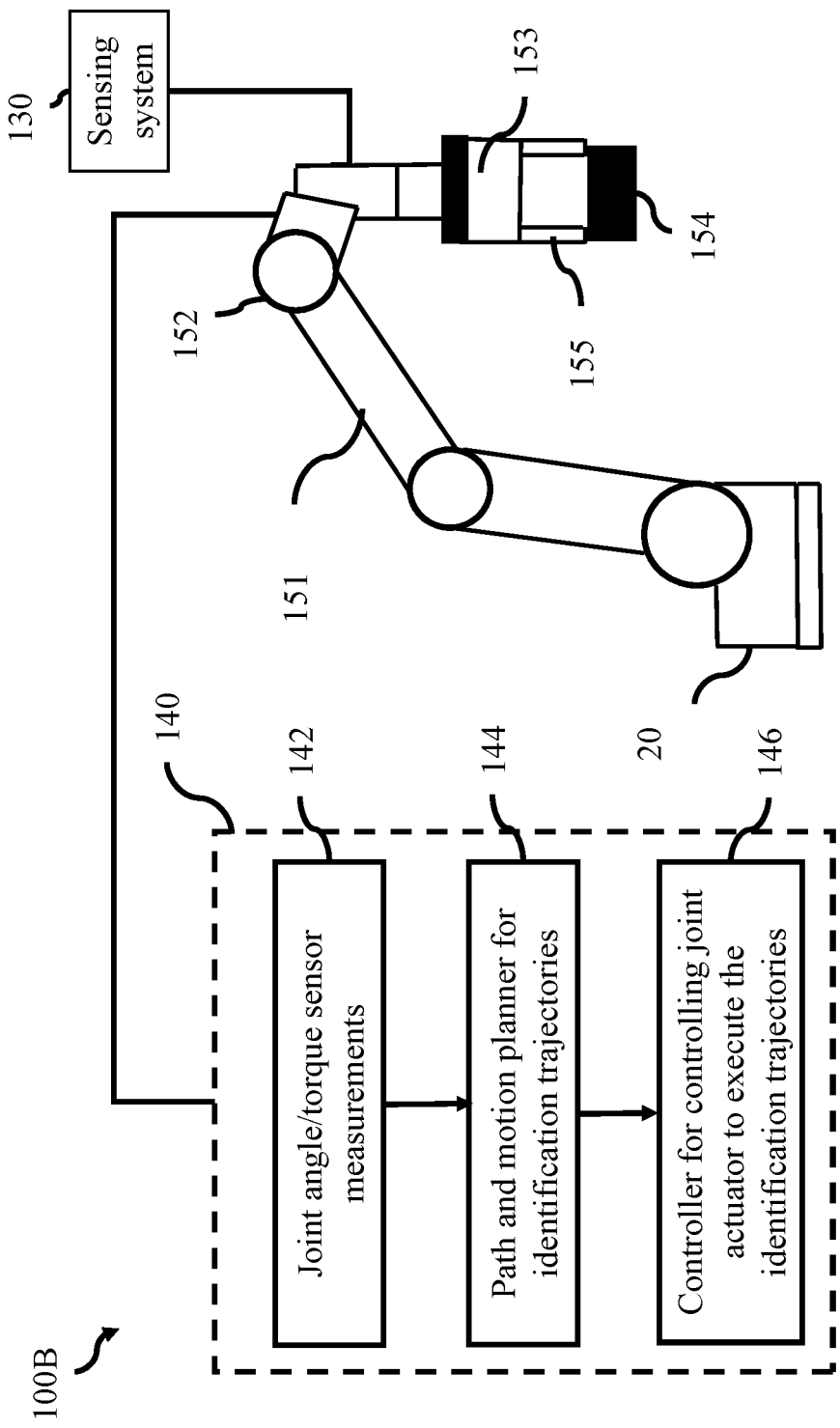
FIG. 1B illustrates a configuration of a robotic manipulator, according to some example embodiments.

FIG. 1B illustrates a configuration 100B of a robotic manipulator, according to some embodiments. The robotic manipulator includes the robotic arm 20 for performing a pick and place operation. The robotic arm 20 includes at least one link 151, one or more joints 152, and a wrist 153 for ensuring multiple degrees of freedom of securely picking an object 154. In some implementations, the wrist 153 is provided with an end-effector 155 for holding the object 154 and/or for performing any other robotic operation, such as an assembly operation. The end-effector 155, for example, may be a gripper. Hereinafter, the terms 'end-effector' and 'gripper' may be used interchangeably. The object 154 may also be a workpiece, a payload, or an obstacle.

The robotic manipulator may be coupled with one or more components such as a sensing system 130 similar to the sensing system 101 of FIG. 1A and one or more controllers 140. The sensing system 130 may provide sensed data regarding the states, positions, orientation and the like for the robotic manipulator, an object or the environment of the manipulator. The one or more controllers 140 perform control processing and generate control signals for executing one or more operations by the robotic manipulator. In this regard some of the key processing modules of the one or more controllers 140 include joint angle/torque measurement module 142, path and motion planner 144 for identification trajectories, and controllers 146 for controlling joint actuators to execute the identification trajectories.

The joint angle/torque measurement module 142 reads the measures of the orientation of the one or more joints 152 from the sensed data provided by the sensing system 130. For example, in some example embodiments, the angular orientation of the joints relative to the link 151 may be calculated based on the sensed data. In a similar manner torque measurements around the joints may also be measured using the sensed data by the module 142. The path and motion planner module 144 performs computations for generating identification trajectories along which the robotic manipulator or a part thereof moves for executing a task. A detailed description regarding the operations performed by the path and motion planner module 144 are described later with reference to FIG. 2.

Figure 1C:
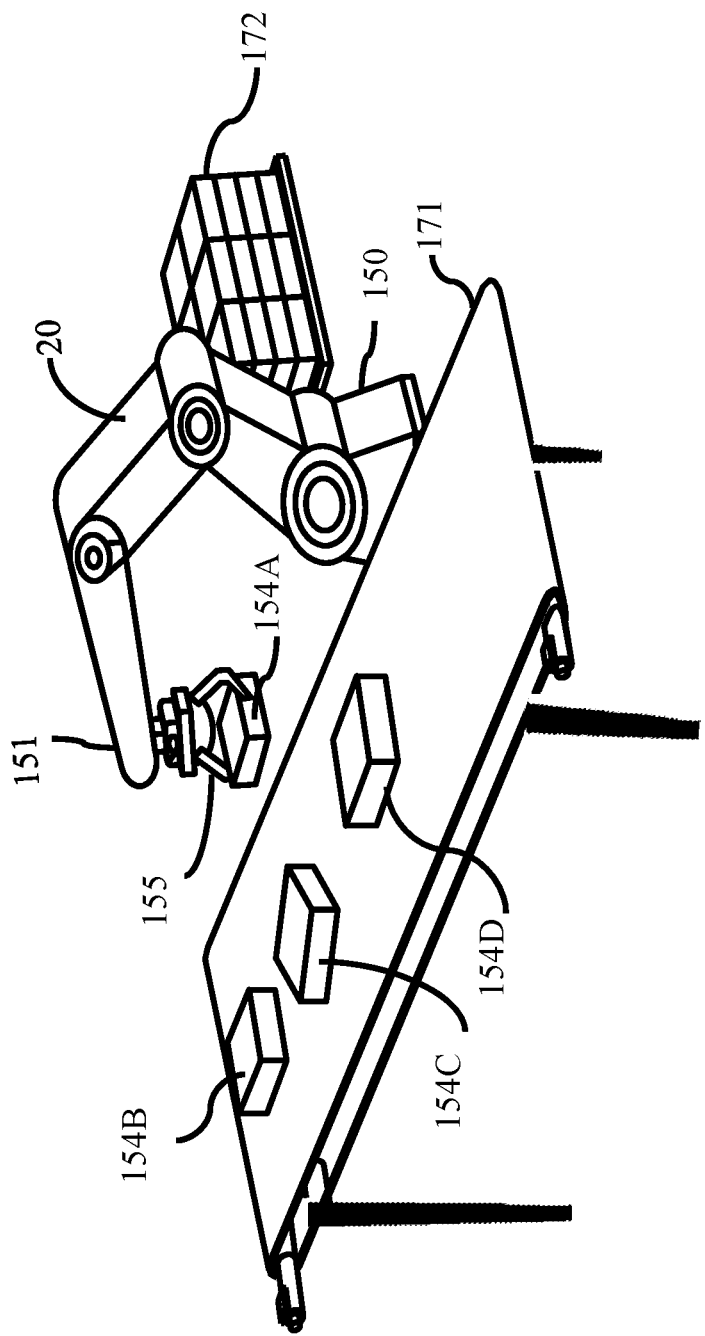
FIG. 1C illustrates an exemplary pick and place task performed by the robotic manipulator, according to some example embodiments.

Pick and place operation facilitates a variety of routine functions such as loading/unloading a workpiece 154A to/from an assembly line 171 shown in FIG. 1C in a manufacturing facility or moving a part around to reorganize storage 172 in warehouse, or moving a part to clear pathway at home. According to an embodiment, an objective of the pick and place operation is to pick a workpiece 154A from amongst the workpieces 154A-154D from one pose in workspace and place at another designated pose.

In some embodiment, the workspace is a specification of the configurations that the end-effector 155 of the robot can reach. Referring back to FIG. 1B, the workpiece 154 is typically held by the end-effector 155 without slip, and thus the pose of the workpiece 154 and the pose of end-effector 155 are referred to as the same thing. The workpiece may also be referred to as load or payload.

In some embodiment, the pose p of the end-effector 155 in a workspace may be represented by (x,y,z) in Euclidian space. In some example embodiments, the pose of the end-effector 155 includes parameters representing the orientation of interest, e.g., at least one of roll, yaw, and pitch.

A robot's configuration is a complete specification of the positions of all points of the robot. The minimum number n of real-valued coordinates needed to represent the configuration is the number of degrees of freedom (DoF) of the robot. The n-dimensional space containing all possible configuration of the robot is called the configuration space (C-space). The configuration of a robot is represented by a point in its C-space. In some embodiment, the configuration $q \in R^n$ of the robotic arm is parameterized by positions of all joints 152 with $q_i$ representing the position of the $i^{th}$ joint. Given a configuration and robot kinematics, the pose of the end-effector 155 is uniquely determined by forward kinematics, which is denoted as a nonlinear function p=FKin(q).

The dimension of parameters to represent the pose of the end-effector 155 is no greater than the dimension of the parameters representing the configuration of the robotic arm 20. In some embodiment, a set of configurations could give the same pose of the end-effector 155. This allows freedom to choose a configuration which not only gives the pose of the end-effector 155, but also possesses other desirable features, e.g., allowing fast and accurate parameter estimation of load 154.

An exemplary pick and place task performed by the robotic manipulator is described next with reference to FIG. 1C and FIG. 1B. The robot 150 is configured to perform the pick and place operation, e.g., unload the workpiece 154A from a conveyor of an assembly line 171 to a target place such as a storage 172. Since the workpiece 154A is held together with the end-effector 155, the pick and place task is equivalent to moving the end-effector 155 to an initial pose $p_0$ in order to grasp the workpiece 154A, and positioning the end-effector 155 at a goal pose pf in order to place the workpiece 154A. Simply put, manipulating the workpiece and moving the end-effector have the same meaning and are used interchangeably. The unloading involves sensing an initial pose of workpiece 54A, determining the goal pose, planning a pick trajectory from a current pose of the end-effector to the initial pose and moving the robotic arm along the pick trajectory to approach the workpiece, picking the workpiece, planning a place trajectory from the initial pose to the goal pose and moving the robotic arm along the place trajectory to the goal pose (place), and finally releasing the workpiece.

As used herein, a path defines spatial locations of the end-effector 155. A trajectory along a given path defines the velocity profile over time while the end-effector 155 moves along the path. In a simple scenario, the trajectory may dictate a motion along one direction. In another embodiment, the trajectory of the end-effector 155 may comprise a motion profile spanning in multidimensional space.

In some embodiment, the path is represented by a sequence of poses of the end-effector 155. Accordingly, the trajectory of the end-effector 155 is defined according to its initial pose and goal pose. In another embodiment, the path is represented by a sequence of configurations of the robotic arm 20 which correspond to the sequence of poses of the end-effector 155. The mapping from the end-effector pose to the configurations of the robotic arm is known as inverse kinematics, which is represented as q=IKin(p). Given a pose p, IKin(p) might admit multiple solutions.

In some embodiment, the pick and place operation is non-repetitive, e.g., each operation differs in either the initial pose, and/or the goal pose, and/or the workpiece. In order to achieve the best system performance and ensure operation safety, it is essential to estimate parameters of the load (workpiece) 154 for place task. Performance metrics to quantify system performance could be the time to accomplish the place task, or positioning accuracy of the place task (how close is the true pose trajectory of the load to the place trajectory), or energy consumption to fulfill the place task.

Figure 1D:
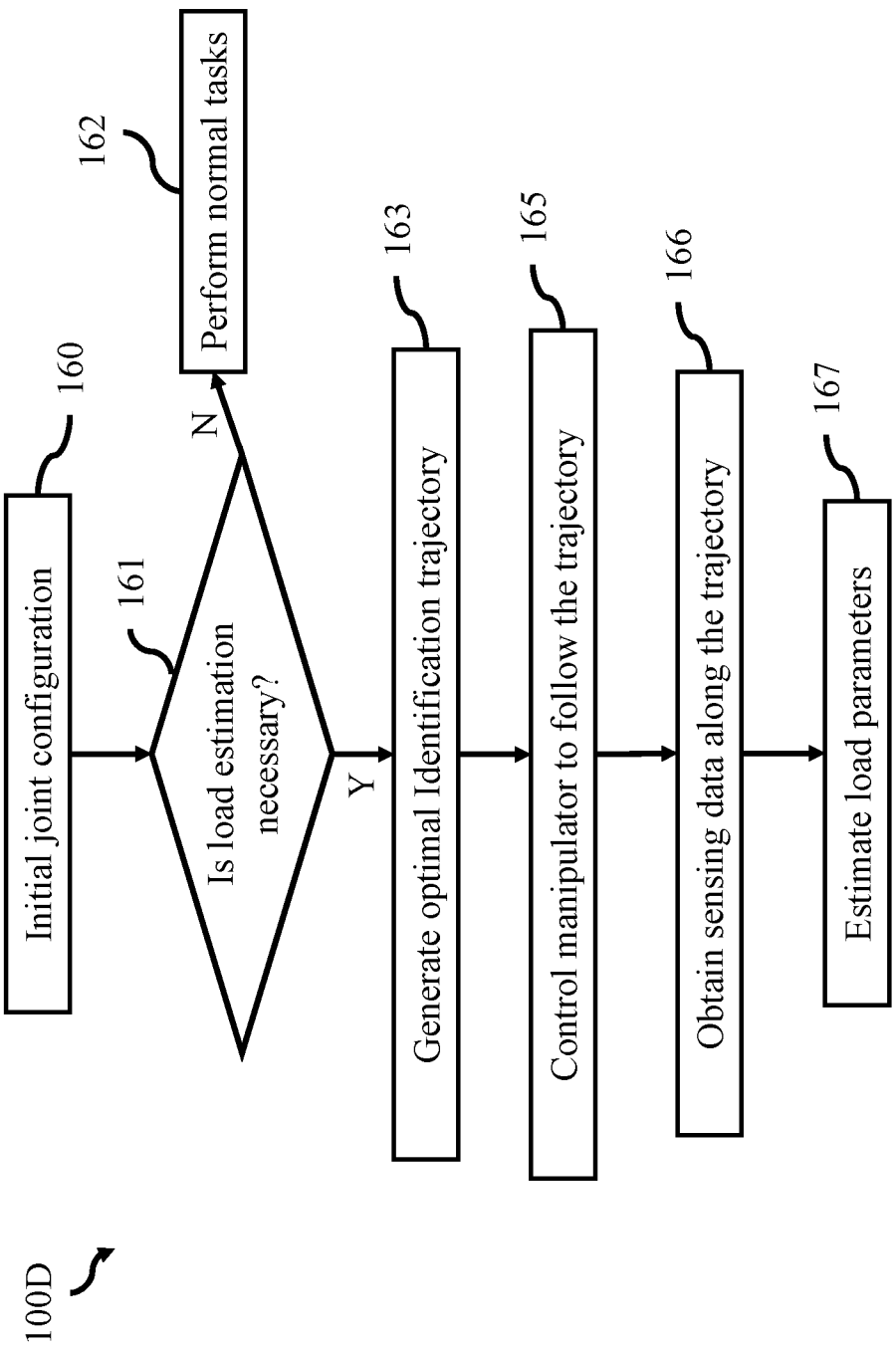
FIG. 1D illustrates a flowchart 100D of an exemplary load estimation task performed by a robotic manipulator, according to some example embodiments.

FIG. 1D illustrates a flowchart 100D of an exemplary load estimation task performed by a robotic manipulator, according to some example embodiments. Initial joint configurations 160 corresponding to the torques and motions of the joints of the robotic manipulator are acquired. A check is then performed if load estimation is required or necessary 161. This may include for example, checking if the workpiece or load is available for pick or place or checking if the sequence of acts to be performed by the robotic manipulator include performing manipulations on the workpiece. If it is determined that load estimation is not necessary, control passes to performing normal tasks 162. If, however, the check at 161 returns the result that load estimation is required, the control of steps passes onto generating optimal identification trajectory 163 for the manipulator.

As discussed previously, effective robotic manipulation requires designing an optimal identification trajectory for the manipulator across which data corresponding to the movements and motions of the manipulator are sensed and processed for estimating the load. Accordingly, the manipulator is controlled 165 to follow or traverse the optimal identification trajectory. As the manipulator follows the optimal identification trajectory, sensor data corresponding to movements and motions of the manipulator joints are obtained 166 along the trajectory and passed on to a controller for estimating 167 the load parameters.

Figure 1E:
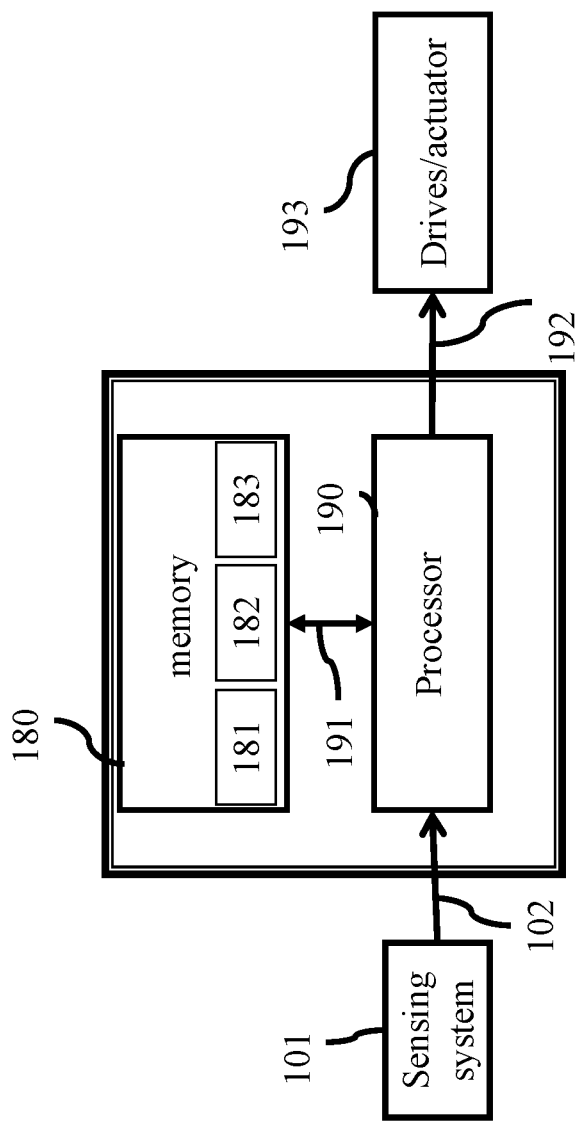
FIG. 1E illustrates a block diagram showing some components of the flexible robotic manipulation system for physical implementation of a method for performing a pick and place task, according to some example embodiments

FIG. 1E illustrates a block diagram showing some components of a flexible robotic manipulator for physical implementation of a method for performing a pick and place task, according to some example embodiments. For example, some components of the one or more controllers 140 of FIG. 1B may be realized with the schema illustrated in FIG. 1E. Memory 180 comprises one or more modules 181-183 for storing the code implementing the functions of the task/path/motion planner 105, the load estimator 115, and the controllers 120 and 140. Processor 190 reads sensed information 102 from the sensing system 101 at every sampled time instant, executes code 191, and outputs processing results 192 to drives/actuators 193. The drives and actuators 193 are part of the robotic arm hardware. In some embodiment, control commands 192 are torque or force references (signals) for actuators to produce. Drives take the control commands and convert them into voltages or currents supplied to the actuators for torques or forces generation which drive the movement of the robotic arm tracks the references.

The movement of the robotic arm 20 is uniquely specified by the trajectory q(t). In some embodiment, actuators are Direct Current (DC) or Alternating Current (AC) electrical machines for angular or linear movements or their combination, and drives comprise of digital and analog electric circuits for fulfilling the electrical energy conversion between different forms: AC to DC, DC to AC.

Referring back to FIG. 1A, some operational aspects of the robotic manipulator may be described. Based on sensed information 102 and robotic arm models/geometry and motion constraints 110, a task/path/motion planner 105 determines the pick and place task, and the pick trajectory and a predicted identification trajectory; and outputs the pick trajectory to controllers 120. Based on the pick trajectory and sensed information 102, the controllers 120 generate commands to the robotic arm 20 so that the end-effector movement follows/traverses the pick trajectory. Once traversal of the pick trajectory is finished and the end-effector grasps the load, the task/path/motion planner module 105 outputs the predicted identification trajectory 106 to controllers 120 which command the robotic arm 20 to track the predicted identification trajectory; at the same time, load estimator 115, based on the robotic arm model 110 and sensed information 102, produces and feeds an estimate 116 of load parameters into planner 105 and controllers 120. The planner 105, based on the estimated load parameters 116, sensed information 102, and robotic arm models 110, produces a place trajectory. Controllers 120, based on the place trajectory and the estimated load parameters 116, probably re-tuned according to the estimated load parameters 116, commands the robotic arm to execute the place trajectory.

In some embodiment, the pick and place task specify the current pose, the initial pose, and the goal pose of the end-effector of the manipulator. In some embodiment, the robotic arm models include the geometric information, kinematics and dynamic models, and motion constraints, of the robotic arm 20.

In some embodiments, a configuration of the robotic arm 20 with an n degree of freedom (n links and n joints) is represented as a n-dim vector $q \in C \subset R_n$. The robotic arm dynamic model 110 may be given by $$M(q)\ddot{q}+C(q,\dot{q})\dot{q}+N(q,\dot{q})=\tau, \quad (1)$$

where $M(q) \in \mathbb{R}^{n \times n}$ is a positive definite mass matrix, $C(q,\dot{q}) \in \mathbb{R}^{n \times n}$ is the Coriolis matrix, $N(q, \dot{q}) \in \mathbb{R}^n$ includes gravity and other forces such as the friction, and $\tau \in \mathbb{R}^n$ is the actuator torque, where $\mathbb{R}^n$ is the n-dim real vector space. The dynamical model (1) contains all the inertia parameters of the links. Specifically, the inertia parameters of the i-th link of the robotic arm for $i \in \{1, \ldots, n\}$ may be given by:

$$\phi_i = [I_i^{xx} I_i^{xy} I_i^{xy} I_i^{xy} I_i^{xy} I_i^{xy} m_i p^T m_i]^T \quad (2)$$

where $m_i$ is the mass, $p_i = [x_i \ y_i \ z_i]^T$ is the center of mass and $$\mathbb{I}_i = \begin{bmatrix} I_i^{xx} & I_i^{xy} & I_i^{xz} \\ I_i^{xy} & I_i^{yy} & I_i^{yz} \\ I_i^{xz} & I_i^{yz} & I_i^{zz} \end{bmatrix}$$

is the moment of inertia. The overall inertia parameters of the robotic arm can be organized as:

$$\phi=[\phi_1^T \phi_2^T \ldots \phi_n^T]^T$$

When a load with inertia parameters $m_L$, $p_L$ and $\mathbb{I}_L$ (in the last joint frame) is attached to the end effector, the inertia parameters of the last link become:

$$m_n' = m_n + m_L, \quad (3)$$
$$p_n' = \frac{m_n p_n + m_L p_L}{m_n + m_L},$$
$$\mathbb{I}_n' = \mathbb{I}_n + \mathbb{I}_L$$

The combined inertia parameters of the robotic arm 20 and the load are $$\phi'=[\phi_1^T \phi_2^T \ldots \phi_{n-1}^T \phi_n'^T]^T,$$

where $\phi_n'$ comprises of $m_n'$, $p_n'$, $\mathbb{I}_n'$ given by (3).

Figure 2:
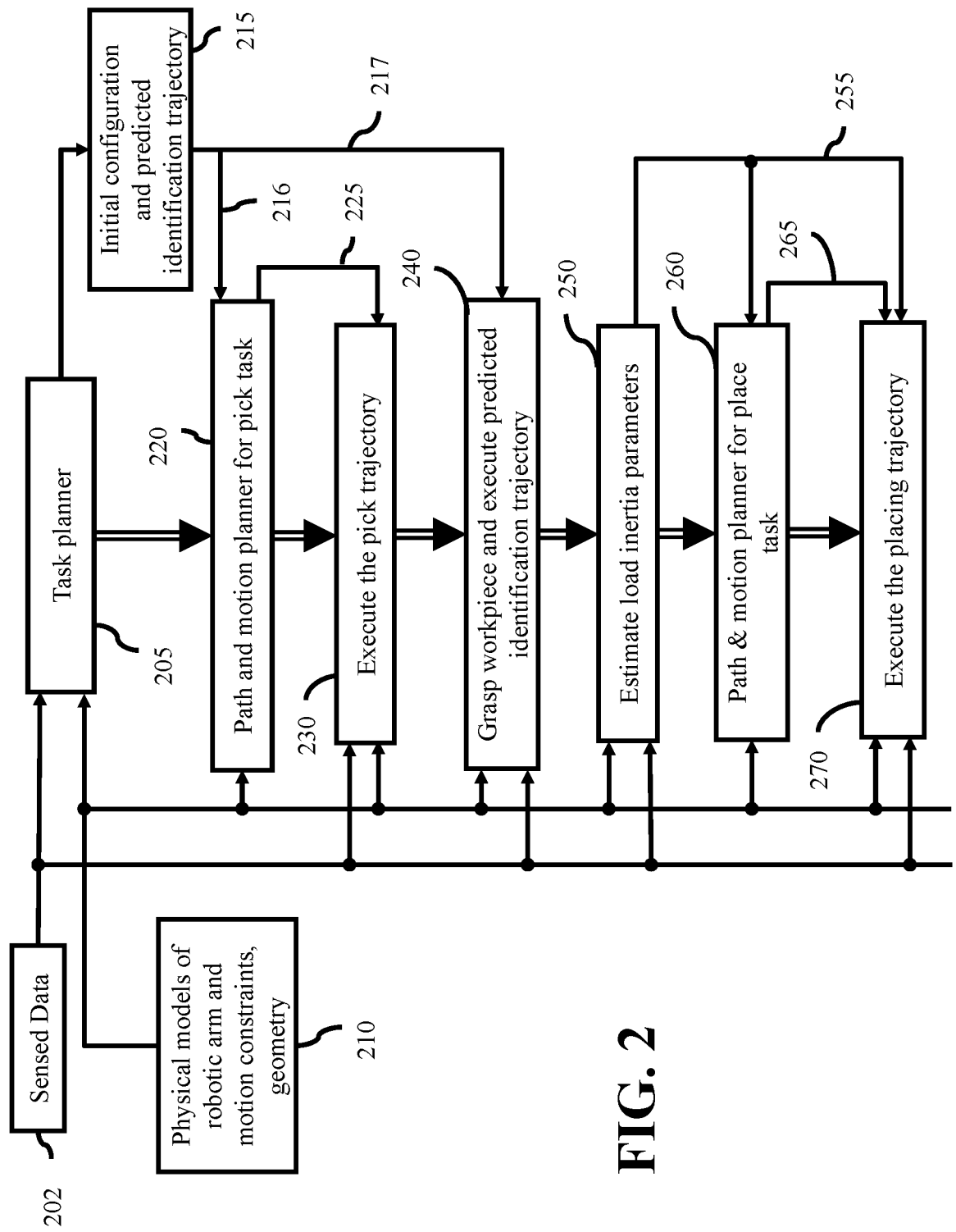
FIG. 2 illustrates some steps of a flexible robotic manipulation method, according to some example embodiments.

FIG. 2 illustrates some steps of a flexible robotic manipulation method, according to some example embodiments. Task planner 205 determines the initial configuration $q_0$ of the robotic arm in order to pick the load. Based on the initial configuration 215, sensed data 202, and robotic arm models 210, the path and motion planner module 220 determines a pick path and motion which connects the current configuration $q_c$ to the initial configuration $q_0$. The pick trajectory may be denoted as $\Phi(q_c, q_0, t)$. Given the pick trajectory, sensed signals, and the robotic model, one or more controllers, such as the controller 120, commands actuators to exert torques/forces on the joints so that the robotic arm executes 230 the pick trajectory. Once the robotic arm stops at a configuration which is close enough to the initial configuration for picking, the end-effector grasps the load and the predicted identification trajectory 215, denoted as $\Phi(q_0, *, t)$ is executed 240.

Meanwhile load inertia parameters are estimated 250, based on sensed data 202 and robotic models 210. Once the traversal of the predicted identification trajectory 215 is finished, the estimated load parameters are fed into task planner 205 and controllers 120. The path and motion planner determines a path and motion trajectory $\Phi(q_i, q_f, t)$ for place task 260, which is then executed 270 to move the robotic arm so that the goal pose of the end-effector (alternatively goal configuration $q_f$ of the robotic arm) is reached closely enough. The second argument of identification trajectory $\Phi(q_0, *, t)$ is left undetermined, because identification trajectory, unlike positioning task, serves distinctive purpose and does not require the trajectory stops at a specified configuration.

In some embodiment, task planner 205, path and motion planner for pick task 220, and path/motion planner for place task 260 are implemented in the task planner module 205. The steps related to execution of the pick trajectory 230, execution of the predicted identification trajectory 240, and execution of the placing trajectory 270 may be fulfilled by controllers 120,140 (or the processor 190) and one or more drives/actuators 193.

In some embodiment, any motion produced at either step 220 or 260 is collision free in the environment. A motion at either 220 or 260 connecting a configuration $q_1$ to another configuration $q_2$ means a collision-free solution q(t) of the robotic dynamic model over a finite time interval [0, T], with $q(0)=q_1$ and $q(T)=q_2$, where T could be pre-chosen or designed. In some embodiment, motion constraints specify the upper and lower bounds of velocities and accelerations of joints, and/or torques/forces of actuators, and/or currents flowing through actuators. In some embodiment, path and motion planners for pick and place task may be the same, but may be provided with different initial and goal configurations.

In some embodiment, the second argument of $\Phi(q_0, *, t)$ is the same $q_0$ to ensure that after the identification trajectory, the robotic arm comes back to configuration $q_0$.

Figure 3A:
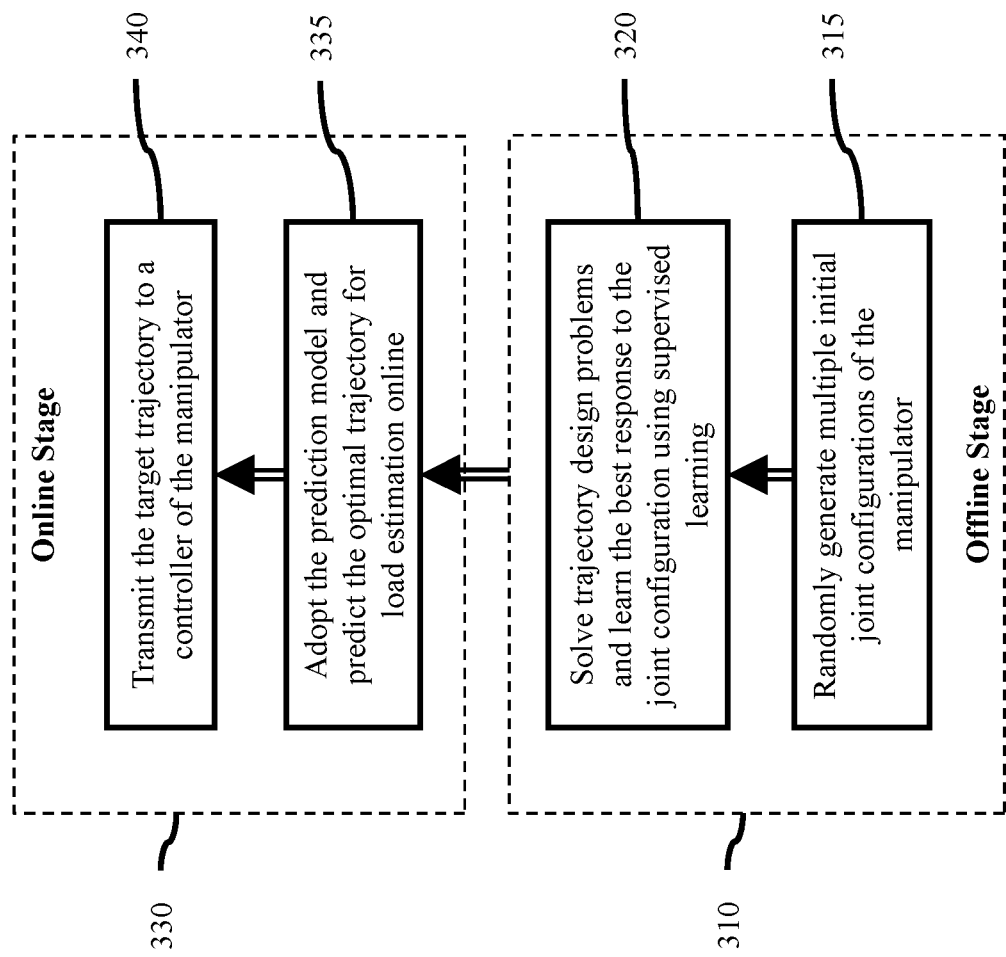
FIG. 3A illustrates a flowchart depicting offline learning of optimal identification trajectory and online computations for predicting optimal identification trajectory according to some example embodiments.

FIG. 3A illustrates a flowchart depicting offline learning of optimal identification trajectory and online computations for predicting optimal identification trajectory according to some example embodiments. In some example embodiments, learning 310 the optimal identification trajectory, which is parameterized by basis functions, with respect to the initial joint configurations may be performed offline. Specifically, some example embodiments construct the optimal response as a function of the initial joint configuration by solving many instances of the trajectory design problem offline beforehand. By solving many instances of the complicated constrained optimization problems regarding trajectory generation offline, the dynamic response of the trajectory parameters with respect to the initial joint configuration is obtained.

Towards this end, a plurality of initial joint configurations of the manipulator are randomly generated 315 by the task planner 205 based on sensed data regarding the manipulator and physical models of the robotic arm and motion constraints and geometry. Accordingly, multiple trajectory design problems are formulated and solved 320 to learn the best response to the joint configurations. In this regard, suitable supervised learning based approaches may be utilized. Some examples of the supervised learning based approaches include linear regression with polynomial basis and Gaussian regressions. In this way, a machine learning model is obtained that can predict an optimal identification trajectory for a joint configuration.

In some example embodiments, the trajectory prediction task 330 may be performed online at run time for load estimation. The prediction model obtained as a part of the offline learning stage 310 may be adopted 335 to predict the optimal trajectory for online load estimation. In this regard, the current joint configuration of the manipulator may be measured from sensed data and a corresponding optimal identification trajectory may be predicted accordingly using the prediction model. The predicted optimal identification trajectory may be transmitted 340 to a controller of the manipulator for execution and further processing for load estimation.

Figure 3B:
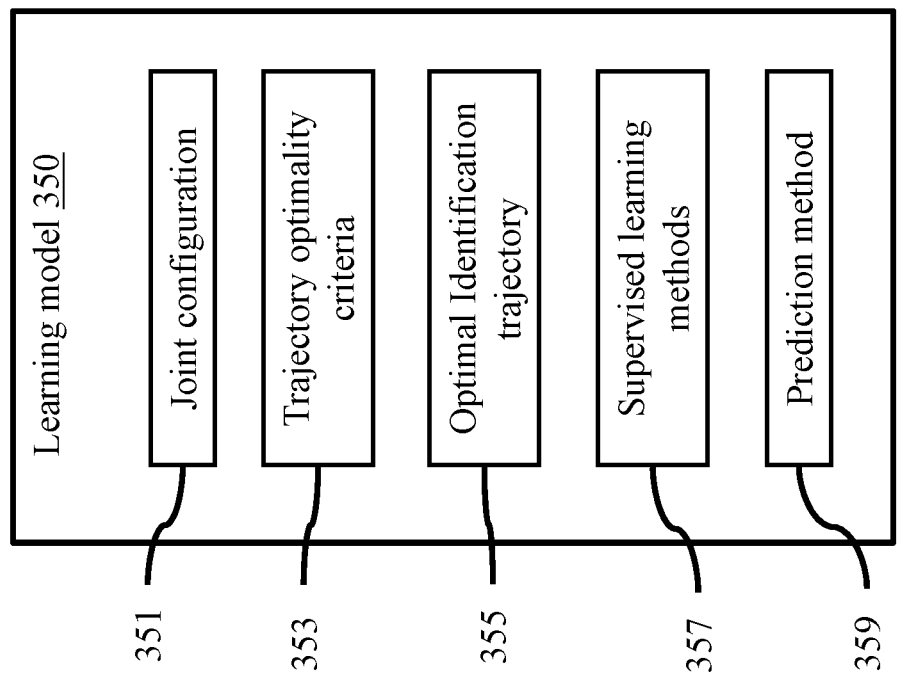
FIG. 3B illustrates a framework of the learning model for predicting optimal identification trajectory, according to some example embodiments.

FIG. 3B illustrates a framework of the learning model for predicting optimal identification trajectory, according to some example embodiments. Learning model 350 comprises a module 351 for obtaining the joint configurations of the manipulator (current, candidate or initial configurations). A trajectory optimality criteria 353 defined with respect to a threshold may be accessible to the learning model 350. Module 355 generates optimal identification trajectories corresponding to the joint configurations of the manipulator by solving trajectory design problems formulated dynamically as per the manipulator model and the joint configuration. Supervised learning methods 357 such as linear regression with polynomial basis and Gaussian regressions are then used to learn the construct of optimal response as a function of the initial joint configuration. Towards this end, several instances of the trajectory design problem may be solved for different joint configurations till a solution that meets acceptable levels is obtained and a link between the joint configuration and optimum identification trajectory is available for learning. In this manner an effective prediction model/method 359 may be learned for further use in online load estimation.

Figure 3C:
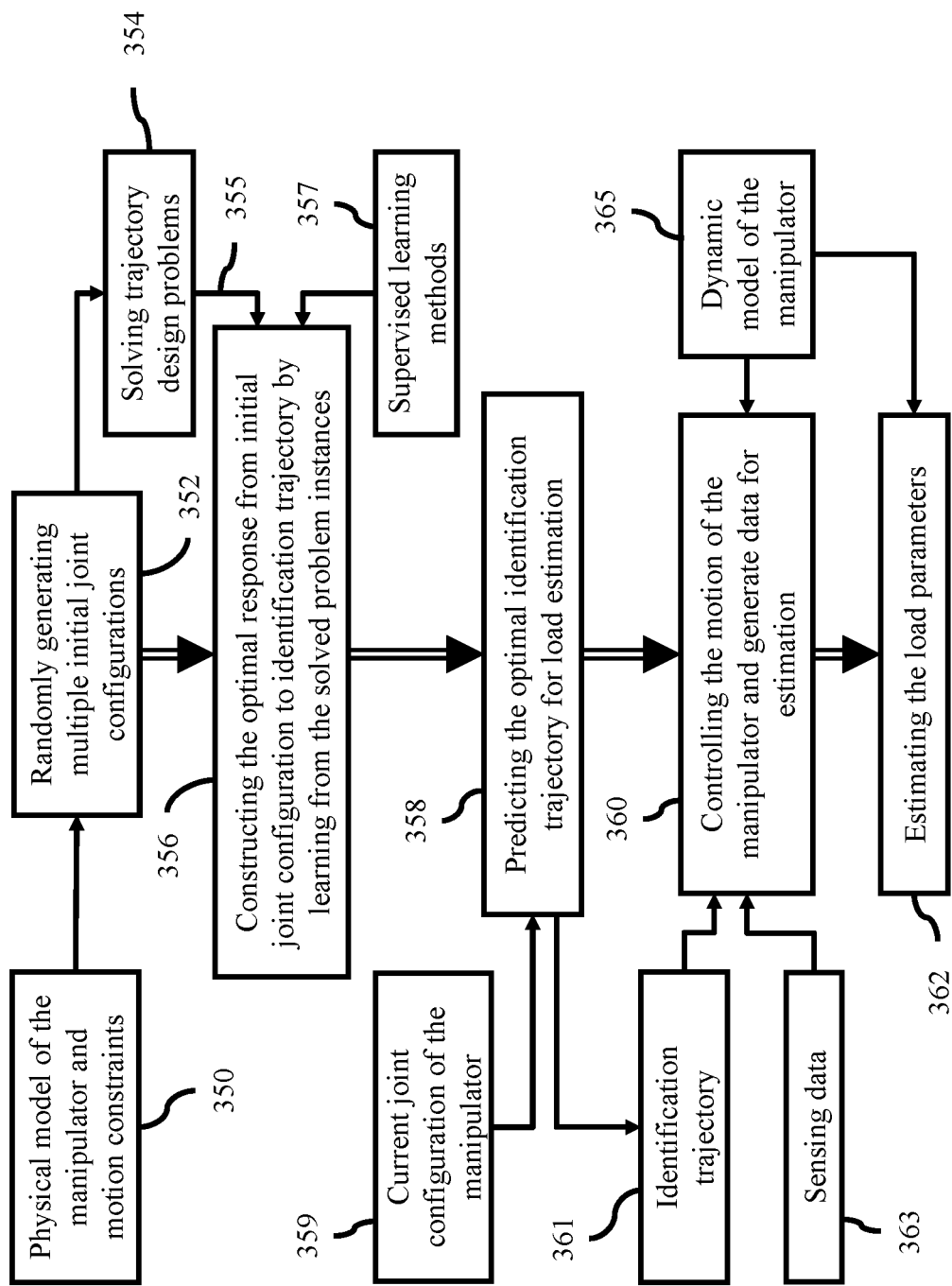
FIG. 3C illustrates a detailed flowchart for online load estimation, according to some example embodiments.

FIG. 3C illustrates a detailed flowchart for online load estimation, according to some example embodiments. Physical model of the manipulator and motion constraints 350 may be obtained, for example from a memory. The learning stage comprises randomly generating multiple initial joint configurations 352 using the physical model of the manipulator and the motion constraints 350. Accordingly, multiple trajectory design problems are formulated 354 based on the multiple initial joint configurations. The trajectory design problems thus generated are solved 354 and optimal responses from the initial joint configurations to identification trajectories are constructed 356. In this regard, supervised learning based methods 357 may be used to learn the optimal responses from the solved trajectory design problem instances 355.

Having obtained a prediction model for predicting the optimal identification trajectory corresponding to a joint configuration, the load estimation process comprises obtaining a current joint configuration 359 of the manipulator. The current joint configuration may be obtained from the sensed data of the manipulator in a manner discussed previously with reference to FIGS. 1A-1D. Based on the current joint configuration, the prediction model predicts 358 the optimal identification trajectory 361 and the control passes to step 360 where the motion of the manipulator (for example via its actuators and joints) is controlled so that the manipulator traverses the predicted optimal identification trajectory 361. In this regard, the dynamic model 365 of the manipulator is also utilized. Furthermore, step 360 comprises monitoring the sensing data 363 as the manipulator traverses the predicted optimal identification trajectory 361 and generating data for load estimation. The data measured at 360 and the dynamic model 365 of the manipulator is utilized for estimating 362 the load parameters.

Figure 4:
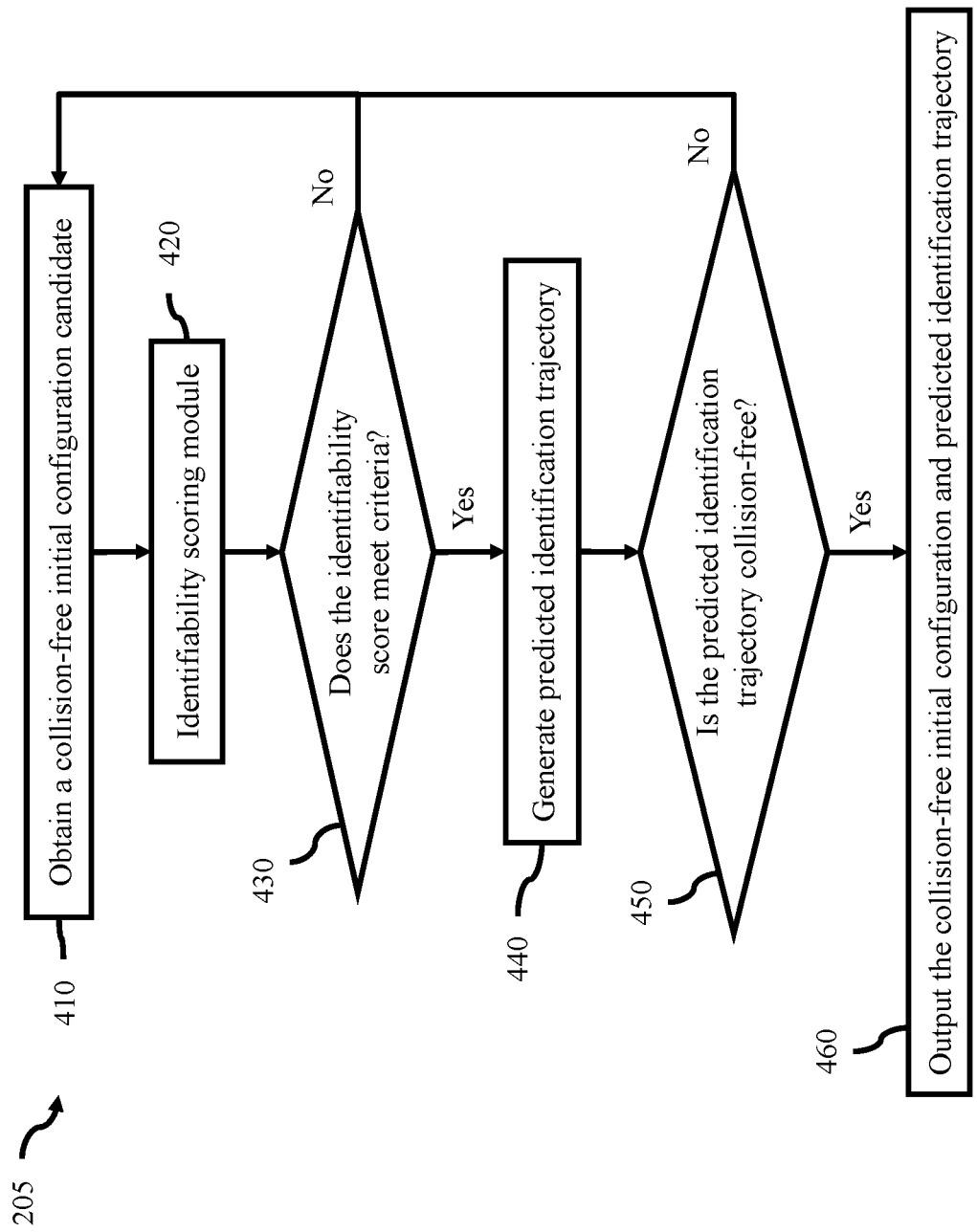
FIG. 4 illustrates a flowchart showing some steps of a method for a task planner to select initial configuration for identification purpose, according to some example embodiments.

FIG. 4 illustrates a flowchart showing some steps of a method for a task planner to select initial configuration $q_0$ for identification purpose, according to some example embodiments. First, a collision-free configuration candidate q is obtained 410 from a plurality of joint configurations. The configuration candidate is submitted to the identifiability scoring module 420 to assess its identifiability score. The identifiability scoring module 420 generates an identifiability score for the configuration candidate q. If the identifiability score does not meet a predefined criteria, the configuration candidate is discarded and the control passes to obtaining another collision free initial configuration candidate at 410. However, if at 430 the identifiability score of the configuration candidate q meets the criteria, the configuration candidate q is selected as the initial configuration $q_0$ and fed into module 440 to generate a predicted identification trajectory, e.g., $\Phi(q_0, t)$. The predicted identification trajectory is subject to collision check at 450. If the predicted identification trajectory is collision-free, the configuration candidate is selected 460 as the initial configuration $q_0$; otherwise, a new collision-free goal configuration candidate is selected at 410 and the process repeats for that configuration candidate.

In some embodiment, the identifiability score is a positive real number and the criteria used at 430 is that the identifiability score is below a certain threshold (typically a finite positive real number). In some embodiment, the collision-free initial configuration candidate may be generated by solving a grasp planning problem which typically admits multiple solutions. In some embodiments, solving the grasp planning gives an optimal initial pose $p_0^*$ of the end-effector according to certain criteria such as maximally stable grasping and the collision-free initial configuration candidate may be obtained by searching for a solution configuration which renders the end-effector pose being the optimal goal pose, i.e., solving for q satisfying $FKin(q)=p_0^*$.

Precise model-based control and task planning requires a good knowledge of the inertia parameters of all links and load, where the parameters of links can be calibrated offline and assumed known, whereas the parameters of load are unknown and to be identified online. Without load, the robotic arm model (1) can be reorganized in a linear form regarding the inertia parameters $$Y(q,\dot{q},\ddot{q})\pi=\tau, \quad (4)$$

where $Y(q, \dot{q}, \ddot{q}) \in \mathbb{R}^{n \times r}$ is a state-dependent regressor matrix with the number of columns $r \leq 10n$ and $\pi \in \mathbb{R}^r$ is the set of identifiable (base) parameters. The parameter vector $\pi$ consists of linear combinations of the original inertia parameters $\phi$, and its specific form depends on the structure of the robotic arm. The identification equation (4) is linear in terms of the identifiable parameters, and the coefficient matrix (a.k.a. the regressor) depends on the state (position, velocity) and acceleration of the robotic arm.

In some example embodiments, the load may be attached to the last link (corresponding to the end-effector), which equivalently changes the inertia parameters of the last link but leaves them unknown. A similar equation as (4) may be derived for the case when a load is present, as follows:

$$Y(q,\dot{q},\ddot{q})\pi'=\tau'. \quad (5)$$

Combining equations (4) and (5) and assuming that the inertia parameters of the robotic arm links are known a priori, the main identification equation for the load parameters may be obtained as:

$$Y_L(q,\dot{q},\ddot{q})\pi_L=\tau_L, \quad (6)$$

where $Y_L(q, \dot{q}, \ddot{q}) \in \mathbb{R}^{n \times r_L}$, $\pi_L \in \mathbb{R}^{r_L}$ and $\tau_L=\tau'-\tau=\tau'-Y(q, \dot{q}, \ddot{q})\pi$. The identification equation (6) is an underdetermined system of linear equations, and multiple samples of $(q, \dot{q}, \ddot{q})$ and the corresponding torques $\tau_L$ must be collected so that a (weighted) least square method can be applied. Assuming N samples of the motion data and torque outputs are available, the following equation may be derived:

$$\begin{bmatrix} Y_L(q(t_1), \dot{q}(t_1), \ddot{q}(t_1)) \\ Y_L(q(t_2), \dot{q}(t_2), \ddot{q}(t_2)) \\ \cdot \\ \cdot \\ \cdot \\ Y_L(q(t_N), \dot{q}(t_N), \ddot{q}(t_N)) \end{bmatrix} \pi_L = \begin{bmatrix} \tau_L(t_1) \\ \tau_L(t_2) \\ \cdot \\ \cdot \\ \cdot \\ \tau_L(t_N) \end{bmatrix}. \quad (7)$$

where $Y_L(q, \dot{q}, \ddot{q})$ and $\tau_L$ denote the regressor and the torques in (7), respectively.

In some example embodiments, in order to identify the load parameters $\tau_L$, the following steps are needed (i) sampling the motion states $(q, \dot{q}, \ddot{q})$, (ii) constructing the regressor $Y_L(q, \dot{q}, \ddot{q})$, (iii) measuring and computing the corresponding actuator torques $\tau_L$, and (iv) solving a (weighted) least square problem. The solution quality of (6) highly depends on the properties of the coefficient matrix $Y_L(q, \dot{q}, \ddot{q})$. A well-designed trajectory along which the motion samples are taken leads to a regressor with desirable properties and thus helps improve the estimation performance. Therefore, example embodiments disclosed herein provide for an efficient estimation of load parameters by providing optimally designed trajectories.

In some example embodiments, the following property of the regressor may be used to quantify the identifiability score $$f(Y_L) = cond(Y_L) + \frac{1}{\sigma_{min}(Y_L)} \quad (8)$$

where $cond(\cdot)$ is the condition number and $\sigma_{min}(\cdot)$ is the minimum singular value. The optimality criterion (or objective function) $f(Y_L)$ takes value from $(1,\infty)$. An arbitrarily generated identification trajectory can result in a large value of $f(Y_L)$, making the load estimation sensitive to measurement noise. Therefore, the identification trajectory is designed so that the objective function $f(Y_L)$ is minimized.

Figure 5A:
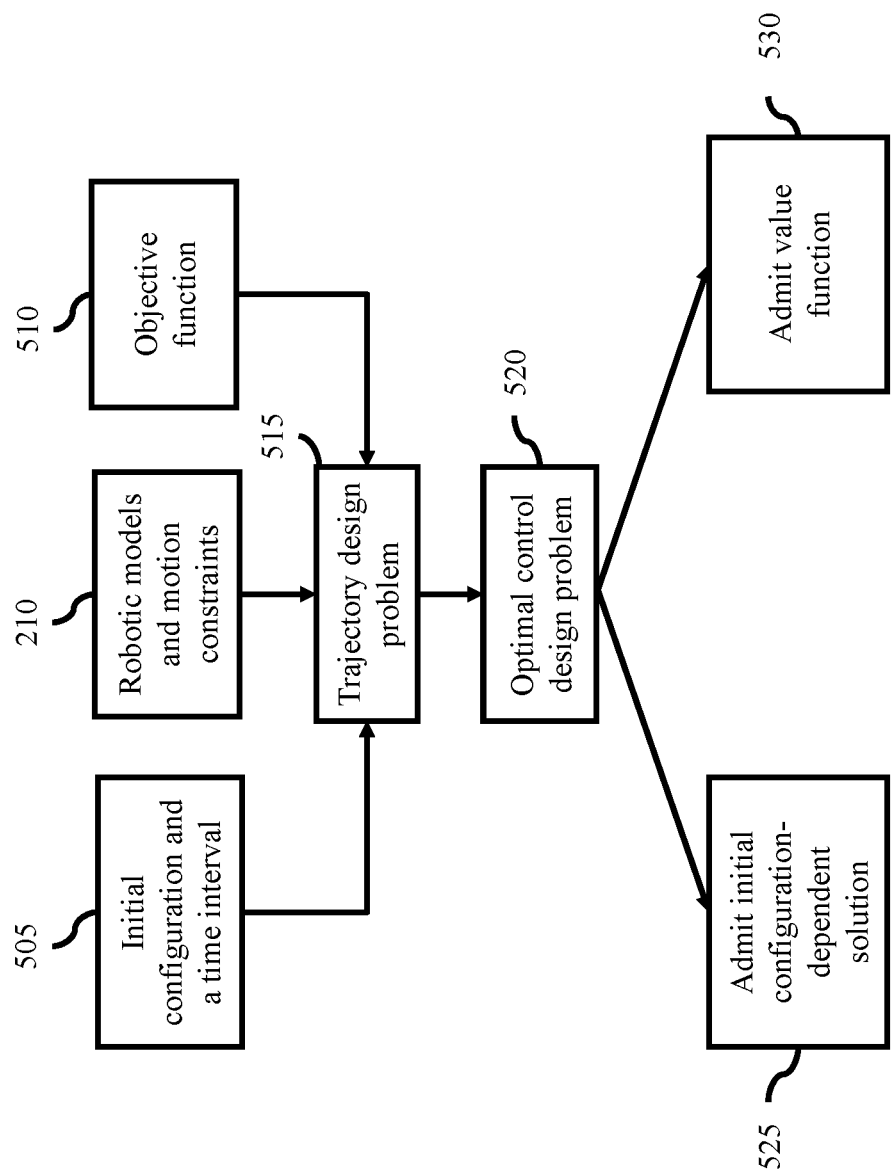
FIG. 5A illustrates a flowchart for reformulation of a trajectory design problem as function approximation problems, according to some example embodiments.

As shown in FIG. 5A, a meaningful trajectory design problem 515 is formulated based on an initial configuration $q_0$ a finite time interval [0, T] 505, robotic models and motion constraint 210, and an objective function 510. The goal of solving trajectory design problem is to find an optimal identification trajectory q(t) over a finite time interval [0, T] with $q(0)=q_0$ and motion constraints, such that the objective function (8) is minimized. Combining the robotic model and inverse dynamics, it is realized that an optimal identification trajectory q(t) implies a unique optimal control trajectory $\tau$ (t). Thus, trajectory design problem, with decision variables being the trajectories of all joints of the robotic arm, may be reformulated as an optimal control design problem 520, where decision variable being the control trajectories of the robotic arm.

In some example embodiments, optimal control problem 520, for a given arbitrary $q_0$, may admit piece wisely continuous or continuous solution $\tau$ ($q_0$, t) 525 in time domain, and the corresponding identifiability score can be obtained $V(q_0)=f(Y_L)$, where $Y_L$ is constructed from trajectory result from $\tau$ ($q_0$, t). The function $V(q_0)$ is called the value function 530. Note that the solution $\tau$ ($q_0$, t) 525 and the resultant identifiability score can be obtained by solving the optimal control problem 520 through numerical optimization, the process is time-consuming and not suitable for online application. According to optimal control theory, the optimal solution and the value function however are functions of $q_0$ whereas the explicit expressions of the functions are very difficult to establish for many real systems including robotic arm. However, given the existence of the functions and the correct argument, it might be approximated them by training. In some embodiments, the generated predicted identification trajectory 440 outputs control trajectory by approximating $\tau$ ($q_0$, t). In other embodiments, the generated predicted identification trajectory 440 outputs joint position trajectory by approximating q($q_0$, t). In some embodiment, the training process is to approximate the value function $V(q_0)$ so that the approximated value function can quickly predict the identifiability score for a given initial configuration $q_0$.

Meanwhile, given a well-defined optimal control problem, the optimality principle implies the existence of a value function $V(q_0)$ 530. Given $q_0$, $V(q_0)$ gives the value of the objective function associated with an optimal solution starting with $q_0$. The value function, although may be unknown, is typically continuous and thus may be approximated well provided appropriate parametrization, e.g., by selecting a good set of basis functions, and enough training data. In some embodiments, the identifiability scoring module 420 implements an approximate value function $\hat{V}(q_0)$ which approximates the value function 530.

In some embodiments, the generated predicted identification trajectory 440 approximates optimal solution ($\tau(q_0, t)$ or $q(q_0, t)$) of trajectory design problem by parameterizations over certain function space spanned by known basis functions, where all parameters are functions of $q_0$. Identifiability score module 420 approximates the value function $V(q_0)$ by parameterizations over certain functional space spanned by known basis functions, where all parameters are functions of $q_0$.

In some embodiments, the optimal control trajectory is decomposed into N−1 time intervals $[t_1, t_2], \ldots, [t_{N-1}, t_N]$ with $t_1=0$ and $t_N=T$, and the control takes a constant value $\tau$ ($t_k$) during the k+1th time interval. Therefore, considering the robotic dynamic model, $Y_L(q(t_k), \dot{q}(t_k), \ddot{q}(t_k))$ may be expressed as a function of ($\tau(t_1), \ldots, \tau(t_{k-1}), q_0$) or ($q(t_{k-1}), \tau(t_{k-1})$), and the objective function may be written as $f(\tau(t_1), \ldots, \tau(t_N), q_0)$. Recognizing that both cond(•) and $\sigma_{min}(\bullet)$ in $f(Y_L)$ are related to matrix $Y_L^T Y_L$, which is given by $$\sum_{k=1}^{N} Y_L^T(q((t_{k-1})), \tau(t_{k-1}))Y_L(q((t_{k-1})),$$

$$\tau(t_{k-1})) = \sum_{k=1}^{N} \alpha(q((t_{k-1})), \tau(t_{k-1})),$$

where $\alpha$ is an n×n matrix. Hence when N is sufficiently large, the robotic model may be augmented by including dynamics of additional n×n states in a as follows $$\dot{x} = \frac{1}{N}\alpha(q(t), \tau(t)), x(0) = 0.$$

The formulation of a trajectory design problem narrows down to finding a control trajectory $\tau(t)$ such that $f(x(T))$ is minimized. Since the objective function depends on states x at final time T, the trajectory design problem is reduced to standard optimal control design problem. It may be assumed that there may exist at least one optimal solution to the optimal control problem. Given the robotic model and motion constraints, initial configuration, and finite final time T, the value of the objective function associated with the optimal solution is fully determined by $q_0$. This implies that the objective function and optimal solution might be approximated by training.

Trajectory design problem admits solutions defined over an infinite dimensional space. However, this may not be suitable for training, where output and input dimensions should be at least finite and preferably low to reduce training complexity. Hence, solving trajectory design problem 354 of FIG. 3C imposes structural restrictions on the classes of trajectories to yield solutions over a finite dimensional space.

In order to reduce the computational burden and speed up the processing, some embodiments partition the configuration space iteratively until the prediction performance in each subspace is sufficiently satisfactory. Specifically, an iterative bisection method may be employed to partition a large subspace into smaller ones, and individual learning models can be trained in each subspace. The process may be repeated until in each subspace, the performance of the prediction reaches a predefined threshold. In some example embodiments, additionally, a tradeoff may be flexibly adjusted between the granularity of the partition and the overall prediction performance according to special use case requirements.

Figure 5B:
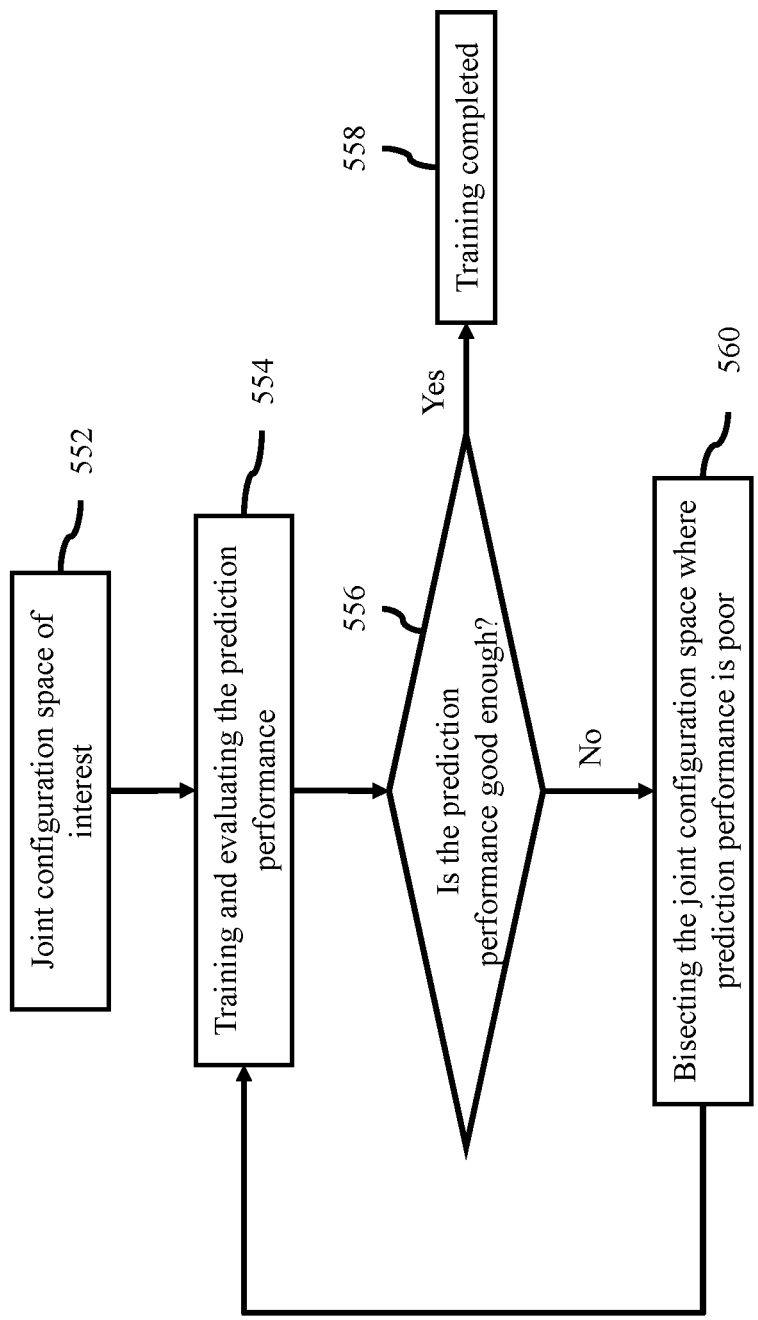
FIG. 5B illustrates an exemplar training method for learning trajectory prediction, according to some example embodiments.

In this regard, FIG. 5B illustrates an exemplar training method for learning trajectory prediction, according to some example embodiments. A space defined by the joint configurations may be selected as a space of interest 552. The prediction model is trained to learn the trajectory prediction in the space of interest and a metric quantifying the prediction performance may be evaluated 554. A check 556 may be performed regarding the quality of the prediction based on the evaluated prediction performance. If at 556 it is determined that the prediction performance is good enough (for example it meets a quality threshold), the training for the space of interest may be closed and be designated as complete 558. If, however, the check at 556 indicates that the prediction performance is not good for the space, the joint configuration space is bisected 560 to separate the subspace where the prediction performance is not good. The control returns to training and evaluating the prediction performance at 554 and the subsequent steps are repeated until a robust prediction model is obtained for the entire joint configuration space of interest.

In some embodiments, the prediction performance over a specific space of interest that the initial configuration belongs to is measured by the percentage of cases that the identifiability score $f(Y_L)$ of the predicted trajectory outputted by the prediction model, or the value of the approximate value function is below a certain threshold. For example, for N distinctive initial configurations $q_0$ over the specific space of interest, one solves the N resultant optimal control problems to obtain the N optimal trajectories and the associated value function values, trains the prediction model with the optimal trajectories and the value function values, and evaluates the identifiability scores of the predicted trajectories from the prediction model. One further calculates the percentage of cases that the identifiability score is below a certain threshold (indicating good estimation accuracy). In another embodiment, the prediction performance over the specific space of interest is such that the root-mean-square-error between the true value function values of N cases and the approximated value function values is less than a certain threshold.

Figure 6A:
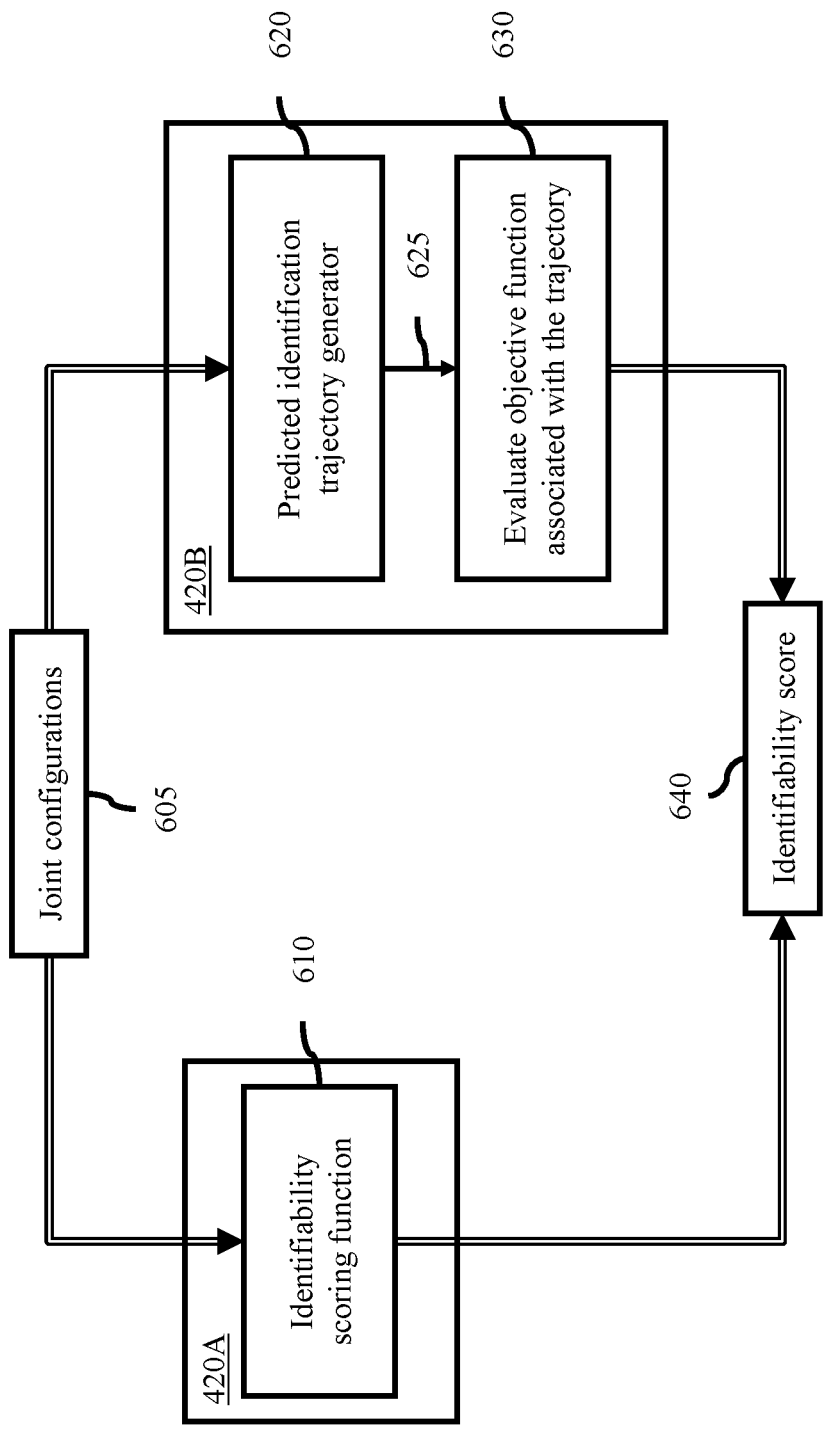
FIG. 6A illustrates two examples of an identifiability scoring module, according to some example embodiments.

FIG. 6A illustrates two embodiment of identifiability scoring module 420 of FIG. 4. In one embodiment, identifiability scoring module 420A may implement an identifiability scoring function 610, which maps a given configuration 605 to a score 640. In such a case, the identifiability scoring function 610 essentially is the approximate value function $\hat{V}(q_0)$. In another embodiment, predicted identification trajectory generator 620 outputs a trajectory 625 corresponding to a given configuration 605. The identifiability score of the trajectory 625, denoted as $f(Y_L)$, is further evaluated, by constructing $Y_L$ as taught above, and treated as the identifiability score of the given configuration 605. The module maps the given configuration 605 to a trajectory starting with the given configuration 605.

Figure 6B:
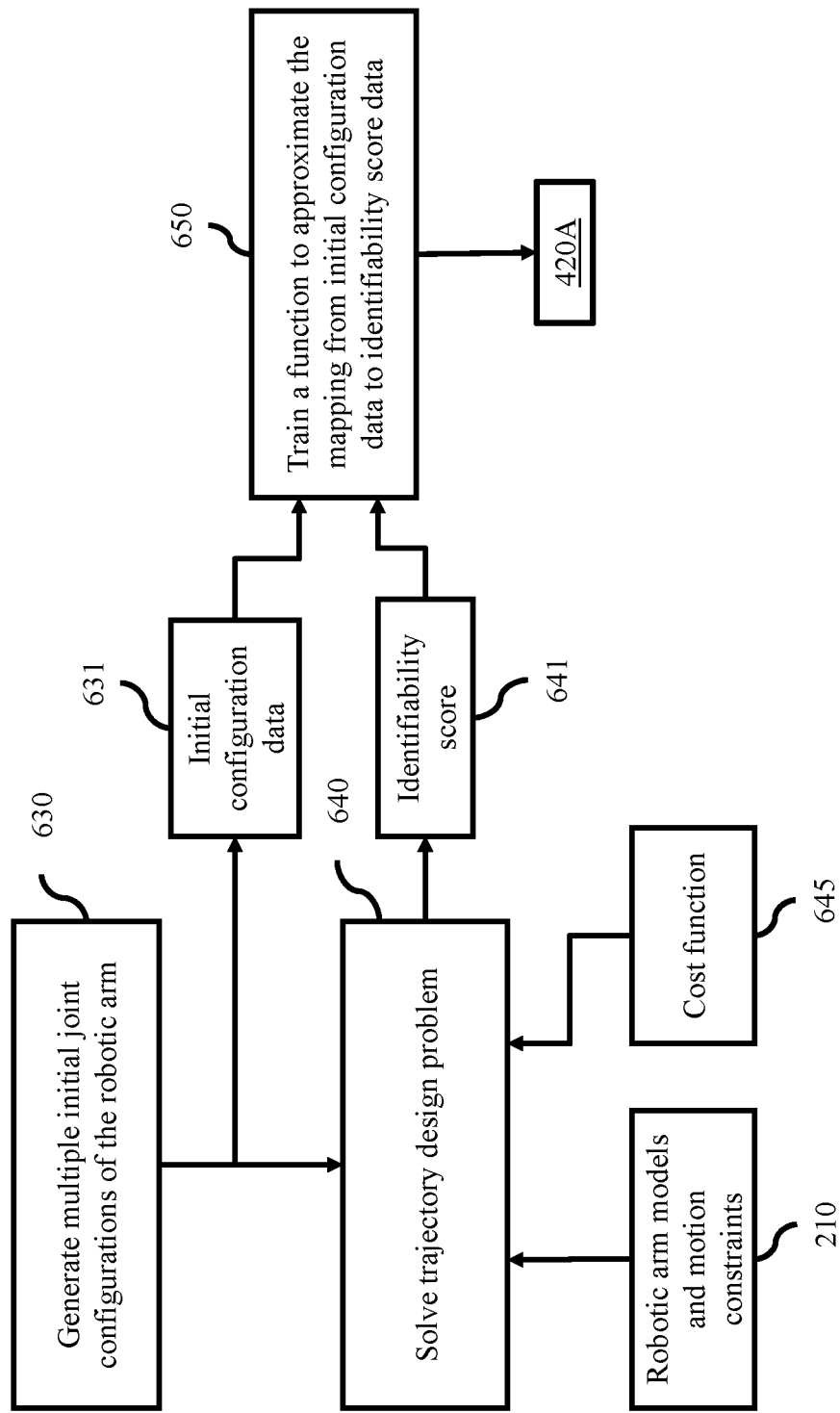
FIG. 6B illustrates an example method for obtaining identifiability scoring function, according to some example embodiments.

FIG. 6B discloses an example method to obtain identifiability scoring function 610, according to some example embodiments. In order to obtain identifiability scoring function 610, multiple initial configurations of the robotic arm are generated 630 and stored as initial configuration data 631. For each initial configuration, given the robotic model and motion constraints 210 and cost function 645, a trajectory design problem 640 is solved to yield an optimal identification trajectory. The identifiability score is the value of the cost function evaluated at the optimal identification trajectory and stored 641. An identifiability scoring function is trained 650 to match the relationship from initial configurations 631 to identifiability scores 641 according to certain criteria.

In some embodiments, initial configurations are generated by randomly sampling or deterministically decomposing the configuration space of interest so that they are evenly distributed over the configuration space C.

In some embodiment, the trajectory design problem 640 assumes the trajectory of joint i is parameterized by $$q_i(t)=q_i(0)+\Sigma_{k=1}^{K}(A_k \sin(k\omega_f t)+B_k \cos(k\omega_f t)) \quad (9)$$

where $q_i(0)$ is the initial joint position, $\omega_f$ is the base frequency of the sinusoidal functions, K is the number of harmonic components, and $A_k$ and $B_k$ are amplitudes. Such parameterization reduces the search space of the mapping between the initial configurations and the identification trajectories. Note that $q(0)=[q_1(0), \ldots, q_a(0)]^T$. The predetermined design choices for the joint trajectory (9) are $\omega_f$ and K, and the amplitudes are the optimization variables that can be tuned so as to minimize the objective function $f(Y_L)$ in (8). The initial joint positions depend on the configuration where the identification task starts, and thus are not design variables. The joint velocity and acceleration are $$\dot{q}_i(t)=\Sigma_{k=1}^{K}(k\omega_f)(A_k \cos(k\omega_f t)-B_k \sin(k\omega_f t)), \quad (10)$$

$$\ddot{q}_i(t)=\Sigma_{k=1}^{K}(k\omega_f)^2(-A_k \sin(k\omega_f t)-B_k \cos(k\omega_f t)). \quad (11)$$

With amplitudes $A_k, B_k$ being given, $q(t), \dot{q}(t), \ddot{q}(t)$ can be calculated and used to update regressor $Y_L$, as well as $f(Y_L)$. Therefore, trajectory design problem 640 is reduced to solving an optimization problem where the amplitudes $A_k$ and $B_k$ of the harmonic functions in (9) are optimization variables and $f(Y_L)$ in (8) is the objective function. Initial configurations 631 $q_0$ and objective function values $f(Y_L)$ are used for training the identifiability scoring function.

In some embodiment, to facilitate the trajectory design problem, the following parameters may have to be preselected:

base frequency $\omega_f$ of the trajectory in (9);
the number of harmonic function components K in (9);
the total execution time $t_N$ in (7) (usually integer multiples of $$\frac{2\pi}{\omega_f}$$

);
the number of samples N along the trajectory in (7) and how the samples are spread out.

Once the above parameters are fixed, given the initial configuration $q(0)$ of the robotic arm, trajectory design problem is reduced to an optimization problem described next.

Given the kinematic structure, the initial configuration $q(0)$ and the motion constraints $\bar{q}$, $\bar{\dot{q}}$, and $\bar{\ddot{q}}$, select the base frequency $\omega_f$, the number of components K of the trajectory, the total execution time $t_N$, and the number of samples N, find a sufficiently excited trajectory by solving:

$$\underset{A_k B_k \in \mathbb{R}}{\text{minimize}} \, cond(Y_L) + \frac{1}{\sigma_{min} Y_L}$$

subject to $Y_L$ is given by (7),
$q_i(t), \dot{q}_i(t), \ddot{q}_i(t)$ satisfy (9), (10), (11), respectively, $$\Sigma_{k=1}^{K}\sqrt{A_k^2+B_k^2}\leq \bar{q} \quad (12)$$

$$\Sigma_{k=1}^{K}(k\omega_f)\sqrt{A_k^2+B_k^2}\leq \bar{\dot{q}} \quad (13)$$

$$\Sigma_{k=1}^{K}(k\omega_f)^2\sqrt{A_k^2+B_k^2}\leq \bar{\ddot{q}} \quad (14)$$

$$\Sigma_{k=1}^{K} B_k=0 \quad (15)$$

$$\Sigma_{k=1}^{K} kA_k=0 \quad (16)$$

The inequalities (12)-(14) encode the physical constraints on the movement range, velocity and acceleration of the joints, where the magnitude of the harmonic functions are overestimated by using the following inequality $$|A_k \sin(k\omega_f t)+B_k \cos(k\omega_f t)|\leq \sqrt{A_k^2+B_k^2}$$

The equalities (15) and (16) ensure that the initial joint position is $q(0)$ and the initial velocity is $O_2$.

Figure 7:
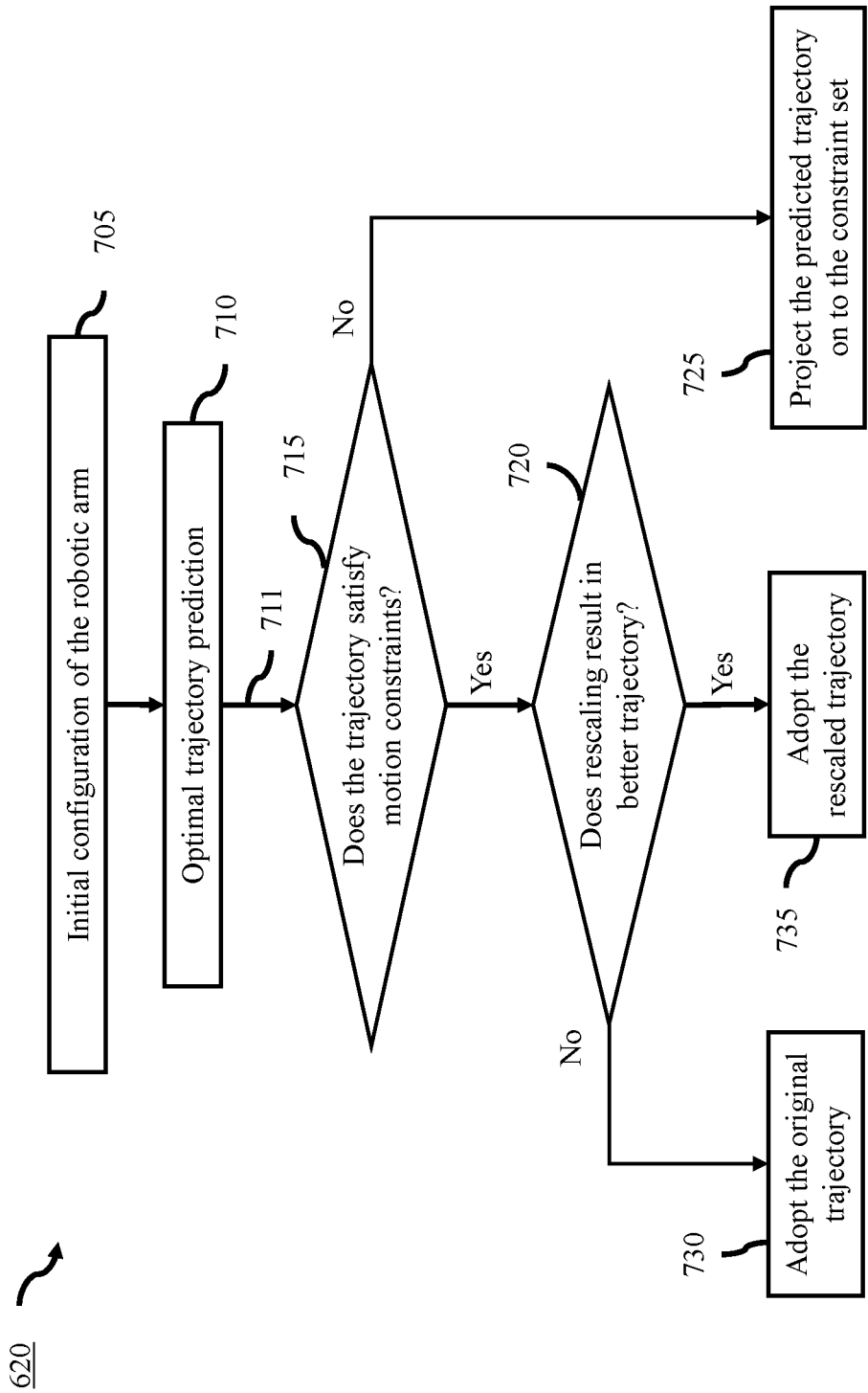
FIG. 7 illustrates a flowchart of predicted identification trajectory generator, according to some example embodiments.

FIG. 7 shows a flowchart of predicted identification trajectory generator 620 according to the second embodiment 420B of FIG. 6A. Given an initial configuration $q_0$ of the robotic arm 705, an optimal trajectory prediction 710 outputs original amplitudes $A_k$, $B_k$, and the corresponding trajectory is verified 715 against motion constraints 210. If the trajectory corresponding to the amplitudes $A_k$, $B_k$ satisfies motion constraints, then a rescaling operation 720 is conducted where the amplitudes $A_k, B_k$ are increased to hit the motion constraints. The rescaled trajectory is adopted 735 if it gives a better identifiability score; otherwise, the trajectory associated with the original amplitudes $A_k$, $B_k$ is output 730. If, however, the trajectory corresponding to the amplitudes $A_k$, $B_k$ do not satisfy the motion constraints, the amplitudes $A_k$, $B_k$ are reduced to ensure the resultant trajectory is compliant to motion constraints 725.

Figure 8:
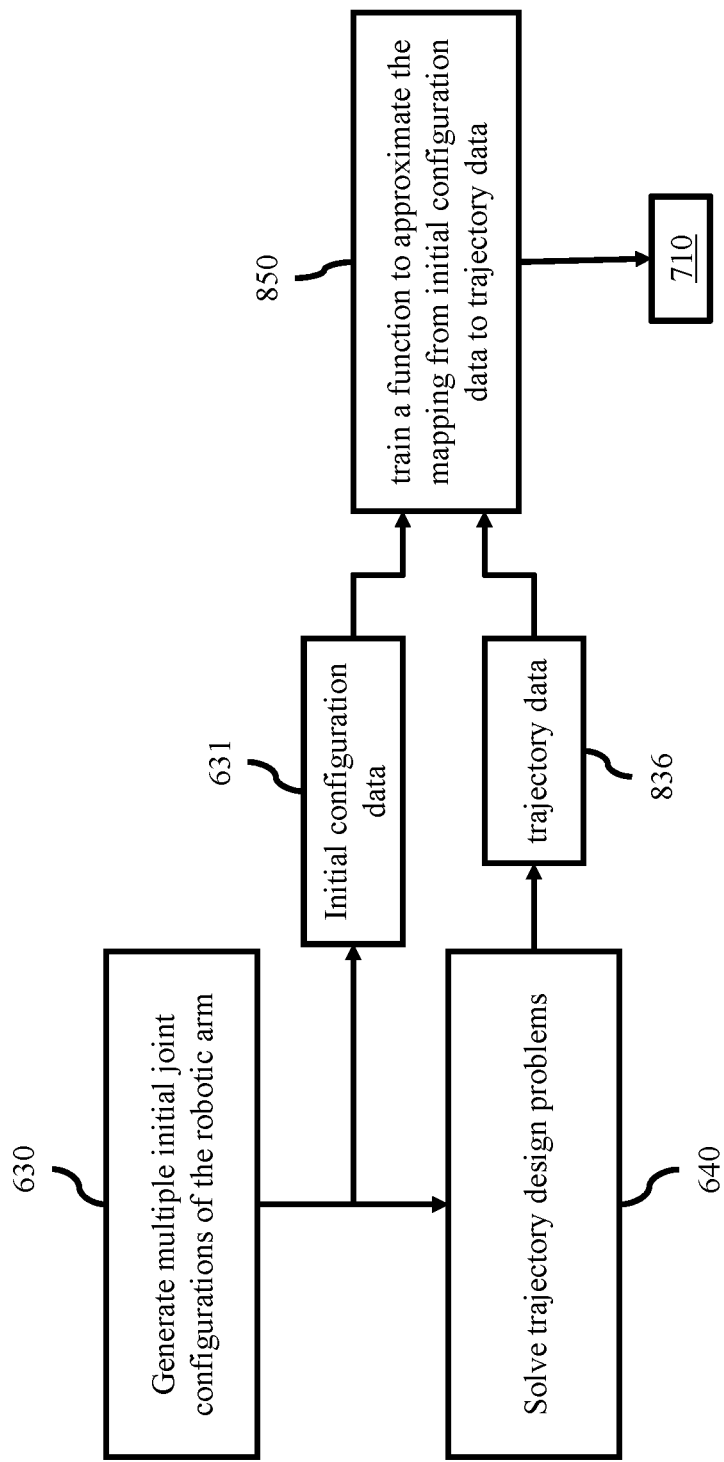
FIG. 8 illustrates a flowchart of a method to obtain predicted identification trajectory generator by training, according to some example embodiments.

FIG. 8 illustrates one embodiment of methods to obtain predicted identification trajectory generator 710 by training. Multiple initial configurations of the robotic arm are generated 630 and stored 631. For each initial configuration, a trajectory design problem 640 is solved to yield amplitudes $A_k, B_k$, which are stored 836 as trajectory data. An identifiability scoring function is trained 850 to match the relationship from initial configurations 631 to identifiability scores according to certain criteria, for instance, the parameters of the identifiability scoring function, or the approximate value function, are determined by minimizing the root-mean-square-error between the true value function values and the predicted values of the approximate value function at various initial configurations. The predicted identification trajectory generator is trained 850, where parameter values of a parameterized function are determined by minimizing the error between the function output 836 and given initial configurations 631.

In some embodiment, the module 710 may predict an identification trajectory violating motion constraints. Additionally, it is recognized that a trajectory hitting motion constraints tends to be better for identification purpose than an unconstrained trajectory. Hence, in some embodiments, rescaling the output of 710 may be necessary for safety and advantageous for better parameter estimation performance.

Figure 9:
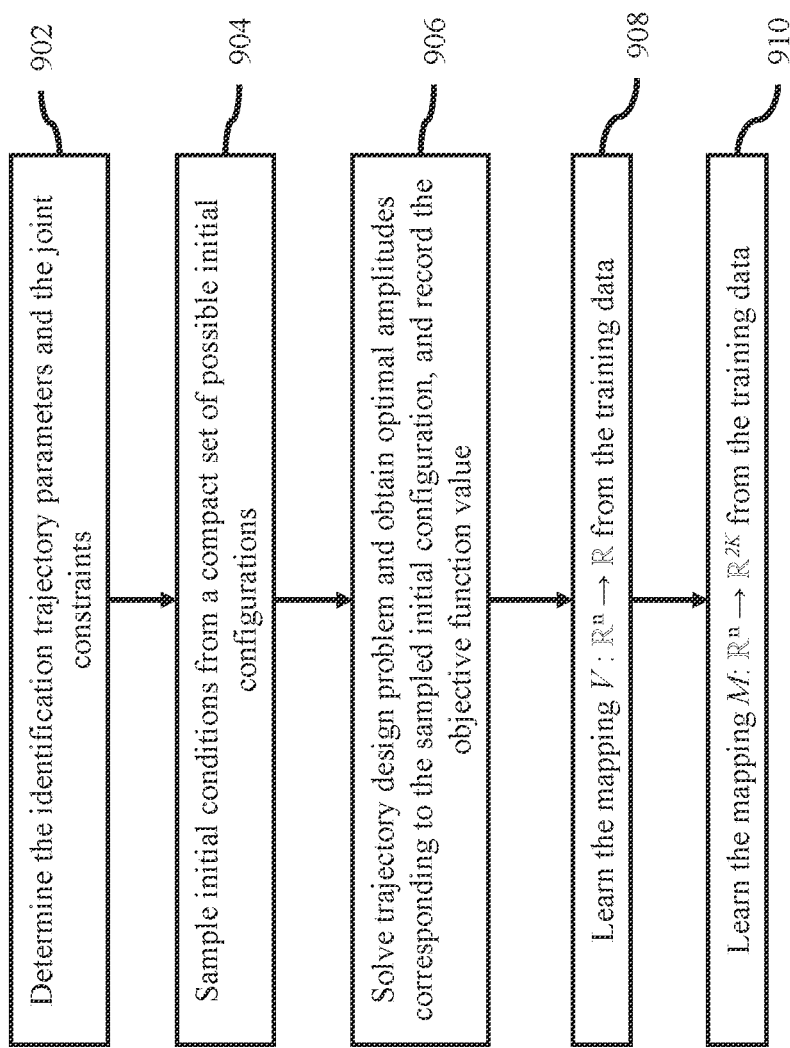
FIG. 9 illustrates a flowchart of a training phase adopted by the robotic manipulator, according to some example embodiments.

In some embodiment, a supervised learning based approach may be provided to train identification scoring function and predicted identification trajectory generator. FIG. 9 illustrates a flowchart of a training phase adopted by the robotic manipulator, according to some example embodiments. The training phase comprises determining 902 the trajectory parameters $\omega_f$, K, $t_N$, N and the joint constraints $\bar{q}$, $\bar{\dot{q}}$, and $\bar{\ddot{q}}$. Initial conditions $q(0)$ are sampled 904 from Q where Q is a compact set of possible initial configurations $$\left(\text{e.g., } Q = \left[-\frac{\pi}{4}, \frac{\pi}{4}\right]^n\right).$$

The training phase further comprises solving 906 a trajectory design problem and obtaining optimal $A_k$'s and $B_k$'s corresponding to the sampled initial configuration and recording the objective function value. The mapping V: $\mathbb{R}^n \to \mathbb{R}$ from the training data $\{q(0), f(q(0))\}$ are learned at 908 while the mapping M: $\mathbb{R}^n \to \mathbb{R}^{2K}$ from the training data $\{q(0), (A_k, B_k)\}$ are learned at 910.

In some example embodiments, the amplitudes of the identification trajectory are parameterized by cubic functions of the initial configuration, i.e., for $k \in \{1, \ldots, K\}$, $$A_k = a_0^k + \Sigma_{i=1}^n a_i^k q_i(0) + \Sigma_{i,t \geq 1}^n a_{i,t}^k q_i = (0) q_t(0) + \Sigma_{i,l,s \geq 1}^n a_{i,l,s}^k q_l(0) q_l(0) q_s(0),$$

where $a^k$'s are parameters to be determined in 850 for. Similar parameterization may also be applied to the amplitudes $B^k$'s.

In another embodiment, amplitudes of harmonics in the identification trajectories may be parameterized by an independent Gaussian Process (GP), i.e., $$y = \mathcal{GP}(x) + \eta,$$

where y is the amplitude output, $x \in \mathbb{R}^n$ is the initial configuration, and $\eta \sim \mathcal{N}(0, \sigma^2)$ is a zero-mean Gaussian random variable with variance $\sigma^2$. The kernel function of the GP model is the squared exponential function $$\mathcal{K}(x_1, x_2) = \alpha \exp\left(-\frac{\|x_1 - x_2\|_2^2}{2l^2}\right),$$

where $\alpha > 0$ is the length scale and $\ell > 0$ is the signal variance. During training, the hyperparameters $\alpha$, $\ell$ and $\sigma^2$ are determined by maximizing the marginal likelihood $p(y|x)$.

In some embodiment, projecting 725 the predicted amplitudes $\mathcal{M}(q(0))$ back to the constraint set may be achieved by 1. subtracting the predicted $A_k$'s and $B_k$'s from their (weighted) averages, i.e., $$\overline{A}_k = A_k - \frac{\sum_{k=1}^K k A_k}{\sum_{k=1}^K k},$$

$$\overline{B}_k = B_k - \frac{\sum_{k=1}^K k B_k}{\sum_{k=1}^K K},$$

so that $\overline{A}_k$ and $\overline{B}_k$ satisfy constraints (15) and (16);
2. uniformly scaling down $\overline{A}_k$'s and $\overline{B}_k$'s (if necessary) so that constraints (12)-(14) are enforced.

Since the linear regressor $Y_L$ depends on the state of the manipulator, the optimal excitation trajectory is related to the starting configuration of the joints. Therefore, if the mapping $\mathcal{M}$ captures such a relationship, then the optimal trajectory can be generated without solving the optimization problem explicitly. Specifically, once the model $\mathcal{M}$ is learned by a supervised learning approach based on the input (q(0)) and the output (optimal $A_k$'s and $B_k$'s), the online trajectory generation problem is transcribed to a simple function evaluation. The predicted trajectory may need to be further processed so that the constraints (12)-(16) are enforced.

Thus, example embodiments disclosed herein achieve significant reduction in the computational complexity associated with load estimation by robotic manipulators. Reduction in computational complexity or in other words simplification of the load estimation process leads to enhancements in performance of the robotic manipulator. An immediate visible enhancement is in the time taken to estimate the load parameters by the control system of the robot. Example embodiments disclosed herein also bring about flexibility in the capabilities of the robotic manipulator to handle variable loads. Thus, a robotic manipulator incorporating the disclosed schema for load estimation will find use in applications that would otherwise not have been possible. In other words, example embodiments of the present invention provide immediate and tangible improvements in the robotic manipulator.

The logic, software, or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code, and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which one or more examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A manipulator, comprising:
   a robotic arm comprising one or more joints configured to move a load according to a task;
   a plurality of actuators configured to change a motion of the robotic arm to track a trajectory;
   a memory configured to store a model of the manipulator with unknown load information and a mapping function mapping initial poses of the load to corresponding identification trajectories;
   an input interface configured to receive an initial pose of the load and the task for moving the load; and
   a processor configured to execute stored instructions implementing different modules of the manipulator, including:
   a load estimator configured to:
      determine using the mapping function, at least one initial configuration of the one or more joints corresponding to the initial pose of the load;
      compute an identifiability score of each initial configuration of the at least one initial configuration of the one or more joints;
      compare the identifiability score of each initial configuration of the at least one initial configuration with a threshold;
      obtain a subset of identification trajectories comprising an identification trajectory for each initial configuration of the at least one initial configuration whose identifiability score exceeds the threshold;
      calculate a motion distance between each initial configuration of the at least one initial configuration and a goal configuration for each identification trajectory in the subset of identification trajectories;
      determine a trajectory in the subset of identification trajectories for which the calculated motion distance is least among the subset of identification trajectories;
      select the determined trajectory as a retrieved identification trajectory in the subset of identification trajectories;
      control the plurality of actuators to move the load according to the retrieved identification trajectory, based on the model of the manipulator with unknown load information;
      obtain measured motion data corresponding to the movement of the load according to the retrieved identification trajectory and estimated motion data of the load corresponding to motion of the load according to the identification trajectory and estimated based on the model of the manipulator; and
      estimate parameters of the load based on the measured motion data of the load and the estimated motion data of the load; and
   a performance controller configured to:
      obtain a model of the manipulator having the load with the estimated parameters of the load;
      determine a performance trajectory to move the load according to the task based on the model of the manipulator having the load with the estimated parameters; and
      control the actuators to move the load according to the performance trajectory.

2. The manipulator of claim 1, further comprising:
   a sensing module configured to sense the initial pose of the load,
   wherein the load estimator is configured to estimate an initial configuration of the joints of the manipulator corresponding to the sensed initial pose, wherein the initial configuration of the joints are input to the mapping function as an argument to output the identification trajectory.

3. The manipulator of claim 2, wherein the mapping function is trained based on training data including a set of initial configurations of the joints and a corresponding set of identification trajectories, wherein each identification trajectory of the set of identification trajectories is optimized for the corresponding initial configurations of the joints.

4. The manipulator of claim 3, wherein the training data is formed by sampling a space of configurations of the joints of the manipulator to generate a sample of the initial configurations of the joints and solving a trajectory design problem for the generated sample of the initial configurations of the joints.

5. The manipulator of claim 4, wherein the trajectory design problem is based on one or more of an initial configuration of the joints, a finite time interval, robotic models and motion constraints, and an objective function quantifying identifiability score of a trajectory.

6. The manipulator of claim 4, wherein the space of configurations of the joints of the manipulator is parametrized by positions of the joints.

7. The manipulator of claim 3, wherein the identification trajectories are parameterized based on coefficients of basis functions.

8. The manipulator of claim 1, wherein the processor is configured to determine the at least one initial configuration of the one or more joints from the initial pose of the load by solving a standard inverse kinematics problem, based on the manipulator model.

9. The manipulator of claim 1, wherein the identifiability score is computed by submitting each initial configuration of the at least one initial configuration to an approximate value function wherein the approximate value function is obtained using training data with initial configuration data as input and identifiability score data as an output.

10. The manipulator of claim 1, wherein the motion distance between each initial configuration of the at least one initial configuration and a goal configuration for each identification trajectory in the subset of identification trajectories measures Euclidian distance between the initial configuration and the goal configuration.

11. The manipulator of claim 1, wherein
    the parameters of the load include a mass of the load, the center of the mass of the load, and the moments of inertia of the load, and
    the model of the manipulator with unknown load parameters includes the geometric information of the robotic arm, kinematics and dynamic models of the robotic arm, and motion constraints of the robotic arm.

12. The manipulator of claim 1, wherein to estimate the parameters of the load the processor is further configured to:
    build an identification model for the manipulator with the parameters of the load as unknown variables;
    select an initial configuration and design a trajectory that has an identifiability score below a finite positive threshold;
    collect and process the motion data along the designed trajectory; and solve a weighted least square problem and extract the parameters of the load.

13. The manipulator of claim 12, wherein the identification model represents all joint torques as a multiplication of a regressor and load parameters, where the regressor is dependent on the manipulator model and the motion data.

14. The manipulator of claim 12 wherein the motion data along the trajectory includes triplet samples of the joint position, joint velocity and joint acceleration along the actual trajectory, in addition to torque along the actual trajectory.

15. The manipulator of claim 1 wherein the one or more joints comprise one or more of prismatic joints, revolute joints, screw joints or spherical joints in open-chain.

16. The manipulator of claim 1, wherein the load estimator is configured to estimate parameters of the load based on a difference between the measured motion data of the load and the estimated motion data of the load.

17. A method of controlling a manipulator, comprising:
receiving an initial pose of a load and a task for moving the load;
determining using a mapping function, at least one initial configuration of the one or more joints corresponding to the initial pose of the load, wherein the mapping function maps initial poses of the load to corresponding identification trajectories;
computing an identifiability score of each initial configuration of the at least one initial configuration of the one or more joints;
comparing the identifiability score of each initial configuration of the at least one initial configuration with a threshold;
obtaining a subset of identification trajectories comprising an identification trajectory for each initial configuration of the at least one initial configuration whose identifiability score exceeds the threshold;
calculating a motion distance between each initial configuration of the at least one initial configuration and a goal configuration for each identification trajectory in the subset of identification trajectories;
determining a trajectory in the subset of identification trajectories for which the calculated motion distance is least among the subset of identification trajectories;
selecting the determined trajectory as a retrieved identification trajectory in the subset of identification trajectories
controlling a plurality of actuators of the manipulator to move the load according to the retrieved identification trajectory, based on a model of the manipulator with unknown load information;
obtaining measured motion data, corresponding to the movement of the load according to the retrieved identification trajectory, and estimated motion data of the load corresponding to motion of the load according to the retrieved identification trajectory and estimated based on the model of the manipulator;
estimating parameters of the load based on the measured motion data of the load and the estimated motion data of the load;
obtaining a model of the manipulator having the load with the estimated parameters of the load;
determining a performance trajectory to move the load according to the task based on the model of the manipulator having the load with the estimated parameters; and
controlling the actuators to move the load according to the performance trajectory.

* * * * *